United States Patent
Grubisic

(10) Patent No.: US 11,210,102 B2
(45) Date of Patent: Dec. 28, 2021

(54) SPECULATIVE BUFFER FOR SPECULATIVE MEMORY ACCESSES WITH ENTRIES TAGGED WITH EXECUTION CONTEXT IDENTIFIERS

(71) Applicant: Arm Limited, Cambridge (GB)

(72) Inventor: Roko Grubisic, Fulbourn (GB)

(73) Assignee: Arm Limited, Cambridge (GB)

( * ) Notice: Subject to any disclaimer, the term of this patent is extended or adjusted under 35 U.S.C. 154(b) by 7 days.

(21) Appl. No.: 16/695,735

(22) Filed: Nov. 26, 2019

(65) Prior Publication Data

US 2021/0157597 A1    May 27, 2021

(51) Int. Cl.
 *G06F 9/38* (2018.01)
(52) U.S. Cl.
 CPC ................... *G06F 9/3842* (2013.01)
(58) Field of Classification Search
 CPC .................................................. G06F 9/3842
 See application file for complete search history.

(56) References Cited

U.S. PATENT DOCUMENTS

| | | | | |
|---|---|---|---|---|
| 6,321,328 B1* | 11/2001 | Karp | ................... | G06F 9/30043 712/225 |
| 2019/0042447 A1* | 2/2019 | Sukhomlinov | .......... | G06F 21/78 |
| 2019/0130102 A1* | 5/2019 | Johnson | .............. | G06F 12/1027 |
| 2019/0138720 A1* | 5/2019 | Grewal | ................. | G06F 9/3863 |
| 2019/0272239 A1* | 9/2019 | Hagersten | ........... | G06F 12/1475 |
| 2019/0310941 A1* | 10/2019 | Veshchikov | .............. | G06F 9/38 |
| 2019/0332379 A1* | 10/2019 | Calhoun | ............... | G06F 9/3802 |
| 2019/0332382 A1* | 10/2019 | Lesartre | .............. | G06F 9/30047 |
| 2019/0339978 A1* | 11/2019 | Wallach | .............. | G06F 12/0891 |
| 2020/0004959 A1* | 1/2020 | Chappell | ............. | G06F 12/0875 |

(Continued)

FOREIGN PATENT DOCUMENTS

| | | |
|---|---|---|
| GB | 2570110 | 7/2019 |
| WO | 2019/138206 | 7/2019 |

OTHER PUBLICATIONS

K. N. Khasawneh, E. M. Koruyeh, C. Song, D. Evtyushkin, D. Ponomarev and N. Abu-Ghazaleh, "SafeSpec: Banishing the Spectre of a Meltdown with Leakage-Free Speculation," 2019 56th ACM/IEEE Design Automation Conference (DAC), Las Vegas, NV, USA, Jun. 2019, pp. 1-6. (Year: 2019).*

(Continued)

*Primary Examiner* — Keith E Vicary
(74) *Attorney, Agent, or Firm* — Nixon & Vanderhye P.C.

(57) ABSTRACT

An apparatus comprises processing circuitry to execute instructions from one or more of a plurality of execution contexts each associated with a respective execution context identifier; a cache; and a speculative buffer. Control circuitry controls allocation of data to the cache and the speculative buffer. A speculative entry, for which allocation is caused by a speculative memory access associated with a given execution context, is allocated to the speculative buffer instead of to the cache while the speculatively executed memory access instruction remains speculative. The speculative entry specifies, as a tagged execution context identifier, the execution context identifier associated with the given execution context. Presence of the speculative entry in the speculative buffer is prevented from being observable to execution contexts other than the execution context identified by the tagged execution context identifier.

19 Claims, 13 Drawing Sheets

(56) References Cited

U.S. PATENT DOCUMENTS

2020/0042732 A1\* 2/2020 Nair ................... G06F 21/6218
2020/0301712 A1\* 9/2020 Sakalis .............. G06F 9/30054

OTHER PUBLICATIONS

Christos Sakalis, Mehdi Alipour, Alberto Ros, Alexandra Jimborean, Stefanos Kaxiras, and Magnus Själander. Ghost loads: what is the cost of invisible speculation? In Proceedings of the 16th ACM International Conference on Computing Frontiers (CF '19), pp. 153-163; Apr. 2019 (Year: 2019).\*

Abraham Gonzalez, Ben Korpan, Jerry Zhao, Ed Younis, and Krste Asanovic. Replicating and Mitigating Spectre Attacks on a Open Source RISC-V Microarchitecture. In Third Workshop on Computer Architecture Research with RISC-V (CARRV), Jun. 2019. 7 pages. (Year: 2019).\*

Arm, "Cache Speculation Side-channels", Whitepaper, Feb. 2018, 13 pages.

Yan et al., "InvisiSpec: Making Speculative Execution Invisible in the Cache Hierarchy", 2018 $51^{st}$ Annual IEEE/ACM International Symposium on Microarchitecture (MICRO), Oct. 24-28, 2018, 14 pages.

\* cited by examiner

SPECULATIVE BUFFER FOR SPECULATIVE MEMORY ACCESSES WITH ENTRIES TAGGED WITH EXECUTION CONTEXT IDENTIFIERS

BACKGROUND

Technical Field

The present technique relates to the field of data processing.

Technical Background

A data processing apparatus may support speculative execution of instructions, in which instructions are executed before it is known whether input operands for the instruction are correct or whether the instruction needs to be executed at all. For example, a processing apparatus may have a branch predictor for predicting outcomes of branch instructions so that subsequent instructions can be fetched, decoded and executed speculatively before it is known what the real outcome of the branch should be. Also, some systems may support load speculation where the value loaded from memory is predicted before the real value is actually returned from the memory, to allow subsequent instructions to be processed faster. Other forms of speculation are also possible.

SUMMARY

At least some examples provide an apparatus comprising:
processing circuitry to execute instructions from one or more of a plurality of execution contexts each associated with a respective execution context identifier;
a cache;
a speculative buffer; and
control circuitry to control allocation of data to the cache and the speculative buffer; in which:
the control circuitry is configured to allocate a speculative entry, for which allocation is caused by a speculative memory access associated with a given execution context, to the speculative buffer instead of to the cache while the speculative memory access remains speculative, the speculative entry in the speculative buffer specifying, as a tagged execution context identifier, the execution context identifier associated with the given execution context; and
the control circuitry is configured to prevent presence of the speculative entry in the speculative buffer being observable to an execution context other than the execution context identified by the tagged execution context identifier specified by the speculative entry.

At least some examples provide a method comprising:
executing instructions from one or more of a plurality of execution contexts each associated with a respective execution context identifier;
in response to a speculative memory access associated with a given execution context, allocating a speculative entry to a speculative buffer instead of to a cache while the speculative memory access remains speculative, the speculative entry in the speculative buffer specifying, as a tagged execution context identifier, the execution context identifier associated with the given execution context; and
preventing the presence of the speculative entry in the speculative buffer being observable to execution contexts other than the execution context identified by the tagged execution context identifier specified by the speculative entry.

Further aspects, features and advantages of the present technique will be apparent from the following description of examples, which is to be read in conjunction with the accompanying drawings.

DESCRIPTION OF EXAMPLES

Figure 1:
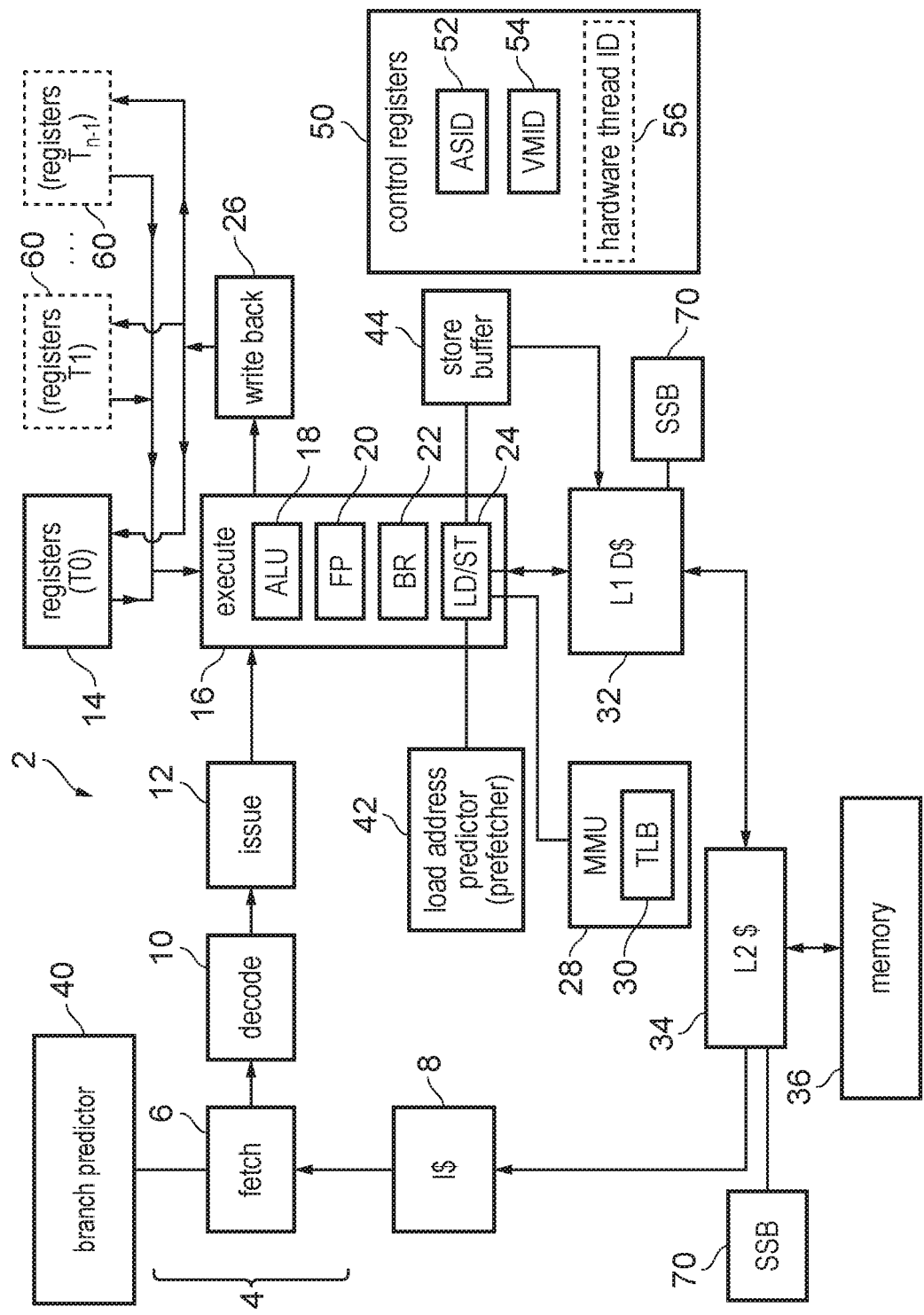
FIG. 1 schematically illustrates an example of a data processing apparatus.

An apparatus has processing circuitry for executing instructions from one or more of a number of execution contexts. Each execution context is associated with a respective execution context identifier. For example, the execution contexts could be different software processes executed by the processing circuitry, instructions executed in different operating states of the processing circuitry, or different threads of execution performed by the processing circuitry. Also, if the processing circuitry includes two or more separate processor cores, the execution contexts could be instructions executed on different processor cores. In some cases different sub-portions of a given software process may have different execution context identifiers (e.g. different address ranges within the given software process may be considered different execution contexts).

The apparatus has a cache and a speculative buffer, and control circuitry to control allocation of data to the cache and the speculative buffer. The control circuitry is capable of allocating a speculative entry, for which allocation is caused by a speculative memory access associated with a given execution context, to the speculative buffer instead of to the cache, while the speculative memory access remains speculative. The speculative entry in the speculative buffer specifies, as a tagged execution context identifier, the execution identifier associated with the given execution context. The control circuitry prevents the presence of the speculative entry in the speculative buffer being observable to an execution context other than the particular execution context identified by the tagged execution context identifier that is specified by the speculative entry.

By providing a separate speculative buffer from the cache, to which entries can be allocated to the speculative buffer when they relate to speculative memory accesses whose speculation outcome has not yet been resolved as correct or incorrect, this avoids polluting the cache with entries associated with addresses speculatively accessed by the processing circuitry. This helps to protect against potential security attacks which could otherwise exploit the property that effects of speculative memory accesses may persist in the cache even after any architectural effects of the speculation have been reversed following a misspeculation. Such attacks may train branch predictors, prefetchers or other speculation mechanisms to trick more privileged code into accessing a pattern of memory addresses dependent on sensitive information, so that less privileged code which does not have access to that sensitive information can use cache timing side-channels to probe which addresses have been allocated to, or evicted from, the cache by the more privileged code, to give some information which could allow the sensitive information to be deduced. By providing a speculative buffer separate from the cache, so that an entry can be allocated to the speculative buffer while the corresponding memory access remains speculative, this means that allocation of speculative data does not affect the addresses for which entries are cached in the cache, reducing the side-channel information which can be gained from measuring cache access timings, and hence limiting the opportunity for the type of attack described above.

By specifying, in a given speculative entry in the speculative buffer, a tagged execution context identifier identifying the execution context associated with the speculative memory access which allocated that entry into the speculative buffer, this means that speculative buffer entries associated with different execution contexts can be distinguished so that it is possible to allow speculative buffer entries for one execution context to remain in the speculative buffer even if the processing circuitry has switched to executing a different execution context. This can provide a performance improvement compared to an alternative approach where all items in a speculative buffer relate to the same execution context and are invalidated in response to a switch of execution context, such as a change of privilege or context switch. By allowing speculative buffer entries to remain even after a switch to a different execution context, then if processing subsequently switches back to the original execution context and some of the speculative buffer entries are still resident in the speculative buffer then performance can be improved because there may be faster servicing of subsequent memory access requests if they can be serviced using the speculative entry still in the speculative buffer.

The control circuitry may exclusively allocate, to the cache, cache entries corresponding to non-speculative memory accesses or speculative memory accesses which have already been resolved as correct. This ensures that an attacker cannot gain insight into information which would not otherwise be accessible, by probing the effects which speculatively executed memory accesses have on the cache.

The control circuitry may permit the presence of a cache entry in the cache to be observable to an execution context other than the execution context which caused the cache entry to be allocated to the cache. This preserves performance by allowing cache entries allocated by one execution context to be visible to another execution context which may need to access the same data, avoiding that other execution context needing to fetch the same data from memory that may already have been cached by a different execution context. This contrasts with the speculative buffer, where access to entries allocated by a different allocation context would be prevented. Hence, by providing the combination of the cache and the speculative buffer this provides a balance between performance and robustness against attack.

In some implementations, the speculative buffer may be associated with a level one cache, but then further levels of cache may not have a corresponding speculative buffer. In this case, the control circuitry may ensure that speculative data from the speculative buffer does not pass beyond the level one cache.

However, in other examples there may be at least two levels of cache, and each of those at least two levels of cache may be associated with a corresponding speculative buffer to store a speculatively allocated entry for transferring to the corresponding level of cache after a speculatively executed memory access instruction which caused allocation of the speculatively allocated entry has been resolved as correct. Hence, by providing speculative buffers for two or more levels of cache, this increases the ability for data accessed in response to speculative memory accesses to be retained for caching at different levels of the cache hierarchy, while providing protection against attacks of the type described above.

Requests to a given level of cache may specify the given execution context which caused that request to be issued. When a given cache needs to send a further request to a downstream cache or memory as a response to a request received from the processing circuitry or an upstream cache specifying the given execution context identifier, then the control circuitry may issue the further request to the downstream cache or memory specifying the same given execution context identifier as the request received from upstream that triggered that further request downstream. Hence, this would allow the further cache or downstream memory to use the same execution context identifier to control allocation or lookups for a further cache.

The execution context identifier associated with a given execution context can be based on one or more pieces of information associated with that given execution context. In general any information which distinguishes one set of executed instructions from another set of executed instructions could be used. For example, the execution context identifier for a given execution context could be determined as a function of at least one of:

a processor core identifier identifying a processor core on which the given execution context is executed;

a hardware thread identifier identifying a hardware thread corresponding to the given execution context;

a virtual machine identifier identifying a virtual machine associated with the given execution context;

an address translation context identifier identifying an address translation context associated with the given execution context; and a program instruction address of an instruction which started execution of a speculative block of instructions from the given execution context.

The execution context identifier could be combined from multiple pieces of information by concatenating two or more of these pieces of information or by performing a hash function to map the two or more pieces of information to a particular identifier value. It is not essential for all of these pieces of information in the examples given above to be used for a given implementation, and some examples could use only a subset of these identifiers.

The use of the speculative buffer with entries tagged with an execution context identifier can be particularly useful for an example where the cache is a shared cache shared between two or more processor cores, for which the speculative buffer is accessible in response to requests issued by any of the processor cores. By providing a tagged execution context identifier in each speculative buffer entry associated with the shared cache this means that requests issued by different processor cores can each allocate speculative entries into the speculative buffer, so it is not necessary to evict all the entries allocated by one core when another core speculatively allocates into the speculative buffer, which would otherwise harm performance by reducing the ability to share the shared cache.

Nevertheless, the technique discussed above can also be used in systems where there is only one processor core, or in which there are multiple cores but each core has its own cache but there is no shared cache.

In some examples, the processing circuitry may execute a number of hardware threads each associated with a respective hardware thread identifier. The execution context identifier associated with a given execution context may in this case depend on the hardware thread identifier of the hardware thread in which the given execution context is executed. The speculative buffer may be accessible to any of the hardware threads executed on the processing circuitry. When processing circuitry supports hardware threads, the processing circuitry has hardware resources for maintaining separate sets of register state for each of the hardware threads. For example, a separate set of registers may be provided for each hardware thread, so that the processing pipeline can easily switch backwards and forwards between executing the different threads without needing to perform performance-intensive operations to save or restore the state of a thread to/from memory. When a processor supports multiple hardware threads then it is much more likely that it may rapidly switch backwards and forwards between threads, compared to a processor which only supports one hardware thread and so performs context switching by saving thread state out to memory and restoring it later when restoring the thread as the current thread being executed. Hence, the technique discussed above where the speculative buffer has its entries tagged with a tagged execution context identifier can be particularly useful for processor cores which support multiple hardware threads.

One particular example of a processor supporting multiple hardware threads can be a processor supporting simultaneous multi-threading (SMT), where each hardware thread has a corresponding set of registers to store the architectural state of that thread, and instructions passing down a processing pipeline are tagged with the particular identifier of the hardware thread corresponding to the instruction. The hardware thread identifier for a given instruction selects which set of registers to access for the instruction's operands or selects which set of registers is to be used for writing the result of the instruction to a destination register. A pipeline supporting SMT can therefore have instructions pending from multiple threads simultaneously.

Other examples of processors supporting multiple hardware threads may provide multiple sets of registers to store the architectural state of that thread, but may only permit the pipeline to have instructions from a single thread at a time, with a hardware register identifying the hardware thread identifier of the hardware thread currently being processed. While this may not allow quite such fast switching between instructions from different threads compared to a processor supporting SMT, it still allows faster switching than in a processor core which only supports a single hardware thread. Hence, the hardware threaded processor can be either a processor using SMT, or a processor which has a pipeline supporting only a single thread but has sets of registers for storing register state for two or more different hardware threads state simultaneously.

The speculative memory access, which causes a speculative entry to be allocated in the speculative buffer, could be an instruction-triggered memory access issued in response to a speculatively executed memory access instruction of the given execution context.

Also, the speculative memory access could be a prefetch-triggered memory access issued by a prefetcher. Unlike demand-triggered memory accesses which are issued in response to executed memory access instructions, a prefetcher may maintain prefetch state data derived from previous memory accesses, and use the prefetch state data to predict which addresses may be needed in future, so that prefetch-triggered memory accesses specifying the predicted addresses can be issued, to try to warm up caches before the time when a subsequent memory access instruction actually requests access to the data from those predicted addresses. As there can be a risk that a malicious attacker could try to train the prefetch state data to cause data from an address dependent on secret information to be speculatively prefetched into a cache, it can be useful to use the speculative buffer for data accessed in response to prefetch-triggered memory accesses which have not yet been resolved as correct. For a prefetch-triggered memory access, the speculation may be considered resolved as correct when a non-speculative memory access instruction requests access to the prefetched address or when a speculatively executed memory access instruction requesting access to the prefetched address has been resolved as correct. The prefetcher may have a mechanism to associate prefetch-triggered memory accesses with corresponding execution context identifiers. For example, the prefetcher could append an identifier of a currently executing execution context to each prefetch-triggered memory access. Some implementations of prefetcher could maintain different sets of prefetch state for different execution contexts, but this is not essential and other implementations may share the same prefetch state data among different execution contexts.

The control circuitry may be capable of allocating the speculative entry to the speculative buffer in response to a speculative read request to request reading of data associated with a target address. Hence, in one example, the speculative memory access described above may be a speculative read memory access.

Speculative read memory accesses may pose the greatest risk of attacks based on cache timing side channels exploiting speculative effects of memory accesses on the cache, as many processor cores may already have mechanisms for preventing the effects of speculative write requests from impacting on the cache. For example, some processor cores may have a store buffer into which the write data of store instructions awaiting writing to memory can be written temporarily before sending it to the cache. This may be done for performance reasons, because if there is limited cache bandwidth then it may take some time before the store request can be serviced by the cache and in the meantime there could be multiple requests targeting the same address which could then be merged into a single request. In a system supporting speculation, it may be considered simpler to avoid sending write requests to the cache until the instruction associated with a store request in the store buffer has been resolved as correct following any speculation, to avoid the complexity of having to subsequently reverse the update of data in a downstream cache or main memory based on an incorrectly speculated instruction. Hence, in some systems speculatively executed write requests may not influence the cache allocation anyway, and so it is not necessary to use the speculative buffer that is associated with a cache to handle such speculative write requests.

The control circuitry associated with a given cache and associated speculative buffer may receive a speculative memory access request (e.g. a speculative read request) from a requester, which specifies a particular target address and a target execution context identifier associated with the execution context in which a speculatively executed memory access instruction which triggered the speculative memory access request was executed. The requester which issued the speculative memory access request could be the processing circuitry itself or could be an upstream cache (e.g. a level 1 cache if the given cache is a level 2 cache). In response to the speculative memory access request received from the requester, the control circuitry may perform a cache lookup in the cache based on the target address, and also perform a speculative buffer lookup in the speculative buffer based on the target address and the target execution context identifier. The cache lookup and the speculative buffer lookup could be performed in parallel to improve performance. Alternatively, the speculative buffer lookup could be performed sequentially after the cache lookup or vice versa. However, as latency associated with handling read requests to a cache may impact on performance at the processing circuitry, it may be preferred to perform the cache lookup and the speculative buffer lookup in parallel.

When the cache lookup for the speculative memory access request identifies a cache miss, and the speculative buffer lookup also identifies a miss (detecting that there is no speculative buffer entry associated with a target address), then the control circuitry allocates a speculative entry into the speculative buffer, instead of allocating a non-speculative entry into the cache. This means that if a misprediction is subsequently detected then the speculative entry can simply be discarded and there will have been no observable effect on cache allocation in the cache which could be exploited by an attacker. In contrast, if the requester had issued a non-speculative memory access request which misses in both the cache and the speculative buffer, then a non-speculative entry could be allocated to the cache instead of the speculative buffer.

On the other hand, if a speculative memory access request is received from a requester, and the cache lookup identifies the cache miss but the speculative buffer lookup identifies that the speculative buffer comprises an existing speculative entry corresponding to the target address for which the tagged execution context identifier matches the target execution context identifier, then the control circuitry can service the speculative memory access request using data stored in the existing speculative entry of the speculative buffer. Hence, data allocated speculatively into the speculative buffer is accessible in response to requests issued from the same execution context which caused that data to be allocated into the speculative buffer, so that performance can be improved compared to an alternative approach of prohibiting caching of speculatively allocated data at all.

However, when the cache lookup performed for a speculative memory access request identifies a cache miss and the speculative buffer lookup identifies that the speculative buffer comprises an existing speculative entry corresponding to the target address of the request, but for which there is a mismatch between the tagged execution context identifier in the existing speculative entry and the target execution context identifier, then the control circuitry may service the speculative memory access request with a delay corresponding to a miss delay incurred in a case when the speculative cache request misses in both the cache and the speculative buffer. Hence, requests issued speculatively by a different execution context from the request which caused data to be allocated speculatively to the speculative buffer encounter a delay which is equivalent to the delay incurred on a miss in the cache and speculative buffer, so that the presence of the speculative entry in the speculative buffer cannot be detected from that other execution context, which provides a defence against the attacker attempting to use cache timing measurements from one execution context to probe the effects of speculatively executed instructions of another execution context.

There may be a number of different ways in which the control circuitry could ensure that a speculative memory access request which hits against an existing speculative entry with a different tagged execution context identifier from the target execution context identifier is serviced with a delay equivalent to a miss delay. In one option, a response to the requester could be returned based on the existing speculative entry, in a similar way to the case when there is a hit against an existing speculative entry with a matching tagged execution context identifier, but that response may be provided after a simulated delay which simulates the delay which would be encountered if the request had actually missed in the speculative buffer. This approach can allow the existing speculative entry to remain valid in the speculative buffer to avoid the overhead of evicting an entry and then reallocating an entry for the same address, which may help to reduce power consumption. For example, analysis performed during system development could identify a realistic delay associated with a miss in the cache and speculative buffer, and some circuit logic can be provided which simulates the corresponding delay.

Alternatively, another approach can be that the control circuitry, in the case where a speculative memory access request hits against a speculative buffer entry for a matching address but a different execution context identifier, may trigger eviction of the existing speculative entry for which the hit was detected, and issue a linefill request to a downstream cache or memory to request re-fetching of data associated with the existing speculative entry which was evicted. Hence, in this case the control circuitry on a hit against a speculative entry with a mismatching execution context identifier may simply simulate the effect of a miss by actually evicting the entry and requesting a linefill the same as if a miss actually occurred, which can allow the delay associated with handling a miss to be simulated more accurately and may reduce the complexity of the control circuitry as it can simply reuse the same circuit mechanisms used on a cache miss.

Regardless of the particular approach taken to ensure that the speculative memory access request which hits against an entry with mismatching execution context identifier is serviced with a delay equivalent to a miss delay, by delaying the servicing of the request compared to the case when a hit is detected against an entry with matching tagged execution context identifier, this avoids an attacker being able to use cache timing side channels to probe the effects of a different execution context on the cache allocation.

In the case where the speculative memory access request hits against a speculative buffer entry having the same target address but a different execution context identifier, the control circuitry may also trigger a request to trigger eviction, from another speculative buffer associated with at least one other cache, of any speculative entry corresponding to the target address and the tagged execution context identifier of that existing speculative entry. This other cache could be an upstream cache closer to the processing circuitry or could be a downstream cache closer to memory. In the case when there is a hit against a speculative buffer entry with a different execution context identifier, then this indicates that there are two or more execution contexts interacting with data from the same address. By broadcasting invalidate requests when such a conflict is detected then this ensures that within the cache system as a whole there can only be one execution context which has speculatively allocated data within the speculative buffers as the time. This can make it simpler to ensure coherency while still ensuring that one execution context cannot learn information about the speculative activity of another context unless the speculation is resolved as correct. Non-speculative entries in caches can still be retained when the speculative memory access request hits against a speculative buffer entry with mismatching execution context identifier, so those non-speculative entries do not need to be subject to the invalidations caused by the hit against the speculative entry with mismatching execution context identifier.

The control circuitry may also support a speculative-promote request which can be issued by a requester specifying a target address (and optionally a target execution context identifier). In response to the speculative-promote request the control circuitry may check whether the speculative buffer has a given speculative entry which corresponds to the target address (and, if specified, the target execution context identifier) specified by the speculative-promote request. If so, then the control circuitry may control the speculative buffer to transfer the information from the given speculative entry to the cache and then invalidate the corresponding speculative entry in the speculative buffer. The processing circuitry may trigger the issuing of a speculative-promote request after it has resolved the speculation was correct for a speculatively executed memory access instruction specifying the target address executed in the execution context associated with the target execution context identifier. In some implementations the speculative-promote request may be issued directly in response to determining that the corresponding speculatively executed memory access instruction was correctly executed. However, this is not essential and other implementations may permit some delay between the resolving of the speculation for a given memory access and the issuing of the corresponding speculative-promote request. For example, to reduce circuit complexity then the checking of which memory accesses have been correctly speculated could be performed in a periodic review, checking a block of instructions at a time, rather than checking each instruction individually. For example, instructions could be associated with an epoch identifier identifying a group of instructions, and once speculation has been resolved as correct for all of the instructions in the same epoch, speculative-promote requests could be issued for the instructions in that epoch. Also, in some instances the processing circuitry could wait for a cycle in which there is no read or write request to issue before issuing the speculative-promote request. Hence it will be appreciated that the speculative-promote request can be issued at a timing which may vary depending on what other requests are being processed or on the particular design chosen for a given processor implementation.

In response to the speculative-promote request, when it is detected that none of the speculative entries in the speculative buffer correspond to the target address (and if specified, the target execution context identifier) specified by the speculative-promote request, then the control circuitry may issue a request to a downstream cache or memory to request fetching of data associated with the target address into the cache. This scenario could arise if one execution context speculatively allocated data into the speculative buffer, but then that entry was invalidated in response to a request from a different execution context. At this point the execution context which originally allocated the data may still expect the data to be within its cache and that execution context should not be aware of whether another execution context may have accessed the same address causing the speculative buffer entry associated with the first execution context to be evicted. Hence, by responding to a speculative-promote request which misses in the speculative buffer by issuing a request to a downstream cache or memory to request fetching of memory or data associated with a target request into the cache, this can hide whether or not a corresponding speculative buffer was previously evicted or remains, which could otherwise provide information which could be exploited to probe the operation of another execution context.

The control circuitry may support a particular form of speculative-promote request which is treated as a read-speculative-promote request. For such a request, in addition to the operations described for the speculative-promote request discussed above, for a read-speculative-promote request when the speculative buffer comprises the given speculative entry corresponding to the target address, then the control circuitry may also control data associated with the given speculative entry to be returned to the requester as a response to the read-speculative-promote request. Also, if the read-speculative promote request misses in the speculative buffer then the data returned from a downstream cache or memory as discussed above may be returned to the requester as well as allocated into the cache. In contrast, other types of speculative-promote requests may cause a given speculative entry to be transferred to (or data re-fetched into) the cache, but may not cause the read data to be returned to the requester. The read-speculative-promote request can be useful for cases where the speculative-promote requests misses in a level one speculative buffer and so the level one speculative buffer then issues a linefill request to a level two cache or beyond, and so the read-speculative-promote request can be used for that linefill to indicate to the level two cache that as well as returning data it can also transfer any speculative entry associated with the target address and the target execution context identifier from its speculative buffer to the level two cache if present in the level two speculative buffer. This saves memory system bandwidth compared to issuing two separate requests for the read and the promotion of the speculative entry respectively.

Another type of request supported by the control circuitry may be a speculative-invalidate request which may specify a target address and a target execution context identifier. In response, the control circuitry may trigger invalidation of any existing speculative entry corresponding to the target address and the target execution context identifier from the speculative buffer or from another speculative buffer associated with another cache. The processing circuitry may trigger the issuing of such a speculative-invalidate request in response to detecting incorrect speculation for a speculatively executed memory access instruction which specifies the target address and was executed in an execution context associated with the target execution context identifier. Hence, when a mis-speculation is detected, any speculatively allocated entries in speculative buffers associated with one or more caches through the system can be evicted so that they will not subsequently be transferred to the cache and so the attacker cannot gain any insight from such evicted entries as from the point of view of the attacker those entries were never allocated.

FIG. 1 schematically illustrates an example of a data processing apparatus 2. The apparatus 2 has a processing pipeline 4 which provides processing circuitry for performing data processing in response to instructions. The processing pipeline 4 has a fetch stage 6 for fetching instructions from an instruction cache 8. A decode stage 10 decodes the fetched instructions to generate control signals for controlling subsequent stages of the pipeline 4 to perform the operations represented by the instructions. An issue stage 12 receives the decoded instructions and queues them while waiting for any required operands to be available in registers 14. When the required operands are determined to be available then the instructions are passed to an execute stage 16 which includes a number of execution units 18, 20, 22, 24 for performing processing operations in response to the instructions. The processing operations may use operands read from the registers 14 and generate a processing result which may be written back to the registers 14 by a write back stage 26 of the processing pipeline 4. Other examples may have a different arrangement of pipeline stages (e.g. a register rename stage for mapping architectural registers specified by instructions to physical registers provided in hardware could be included)

In this example, the execute stage 16 includes, as the execution unit, an arithmetic/logic unit (ALU) 18 for performing arithmetic or logical operations on integer operands, a floating-point unit 20 for performing floating-point operations for which at least one of an input operand and an output operand is represented in floating-point representation, a branch unit 22 for evaluating the outcome of branch instructions for triggering non-sequential program flow, and a load/store unit 24 for controlling access to memory. The load/store unit (LSU) 24 may execute load instructions which control the load/store unit to load data from the memory system to the registers 14, or store instructions which control the load/store unit 24 to store data from the registers 14 to the memory system. It will be appreciated that the particular set of execute units 18 to 24 shown in the example of FIG. 1 is just one possible implementation and other implementations may have different sets of execute units. For example one or more of the types of execute units shown in FIG. 1 could be omitted, or one of these types could be duplicated so that several execute units of the same type may be provided. Also other types of execute unit may be provided dedicated to handling other classes of processing operation not shown in FIG. 1.

For the load/store operations performed by the load/store unit 24, virtual addresses specified by the load/store instructions may be translated into physical addresses by a memory management unit (MMU) 28, based on address mappings defined in page table data obtained from page table structures within the memory system. A translation lookaside buffer (TLB) 30 may be provided to cache page table entries from the page table structures for faster access by the memory management unit 28.

In this example the memory system includes the level 1 instruction cache 8, a level 1 data cache 32, a shared level 2 cache 34 used for either instructions or data, and main memory 36. However, it will be appreciated that this is just one example of a possible cache hierarchy and other examples could have a greater number of cache levels or could have a different relationship between the instruction caching and the data caching.

The apparatus 2 has at least one speculation mechanism for predicting an aspect of program execution and controlling the pipeline 4 to perform speculative execution of at least one instruction based on the prediction. For example, one speculation mechanism may be a branch predictor 40 which predicts properties of branch instructions to be executed by the processing pipeline 4. For example, the branch predictor 40 may predict whether a branch is to be taken or not taken, and if it is to be taken, may predict the target address of the branch. The fetch stage 6 may fetch subsequent instructions beyond the branch based on the prediction provided by the branch predictor 40. The branch prediction may be based on branch predictor state maintained by the branch predictor, which is trained based on outcomes of branches executed by the branch unit 22 in the execute stage 16. Any known branch prediction technique may be used for the branch predictor 40.

Another example of a speculation mechanism may be a load address predictor 42 or prefetcher which may predict target addresses of load instructions to be executed by the load/store unit 24 so that a load can be issued before one or more operands for calculating the target address of the load are available. For example, the load address predictor 42 could include a stride predictor which detects stride patterns where the load target addresses of successive load instructions are separated at intervals of some constant stride value, and once such a pattern has been detected the load address predictor 42 may predict that subsequent addresses will also follow the same stride pattern. The prefetcher may issue prefetch load requests (which are not directly triggered by instructions executed by the pipeline but are based on the address predictions provided by the load address predictor 42) to prefetch into the level 1 data cache 32 the data from the predicted addresses so that when a load instruction subsequently is executed to one of the predicted addresses then the performance will be faster because the level 1 data cache 32 has been warmed with the required data.

It will be appreciated that other forms of speculation mechanism could also be provided.

The load/store unit 24 executes store instructions to store data from registers 14 to the memory system. A store buffer 44 may be provided to temporarily retain the data to be written to the memory system by the store instructions, while waiting for sufficient memory bandwidth to be able to send the stores out to the cache or memory system. The store buffer 44 may also permit merging of different store requests to the same address to save memory bandwidth. When a store instruction is executed speculatively then its store data is retained in the store buffer 44 until the speculation has been resolved and the store instruction can be committed, so that once the speculation has been resolved as correct then the store data can be transferred to the level 1 data cache 32.

As shown in FIG. 1, the apparatus 2 may have some control registers 50 which store configuration information for controlling an operation of the data processing apparatus 2 and status information indicating status of the apparatus 2 and/or the program instructions being executed. Some of the control registers 50 may indicate various state identifiers indicating a current execution state of the processing pipeline 4. For example, the control registers 50 may include an address space identifier register 52 which maintains an address space identifier (ASID) which is associated with a current execution context being executed by the pipeline 4. Execution contexts having different ASIDs may be associated with different sets of page tables for performing address translation at the MMU 28. The ASID stored in register 52 can be used by the TLB 30 to control looking up page table entries so that TLB lookups from one execution context do not hit against entries cached in the TLB 30 for an execution context with a different ASID 52.

Execution contexts executed by the pipeline may also be associated with a virtual machine identifier (VMID) stored in a register 54, which indicates which virtual machine the context is associated with. In a system supporting virtualisation the processing apparatus 2 may execute program code from two or more different virtual machines which may coexist on the same physical platform. The VMID 54 distinguishes which virtual machine is currently being executed.

Optionally, in some implementations the processing apparatus 2 may support multiple hardware threads being executed using the processing pipeline 4. In this case, in addition to the set of registers 14 provided for a first thread, the apparatus may also comprise further sets of registers 60 for at least one further hardware thread. This allows the processor to maintain multiple sets of register state for two or more hardware threads simultaneously. Hence, this can allow the pipeline to rapidly switch between processing one hardware thread and processing another hardware thread, to eliminate the context switching overhead of saving and restoring thread states to and from the memory system. In one example of a hardware-thread-supporting processor, the control registers may include a hardware thread identifier register 56 which stores the identifier of the currently executing hardware thread. In this case, then to switch between hardware threads the pipeline would need to wait until the instructions of one hardware thread have drained and/or been committed by the write back stage 26 before starting to execute instructions from a different hardware thread after changing the hardware thread identifier in register 56. The set of registers 14, 60 to access for a given instruction depends on the hardware thread identifier in register 56.

Alternatively, some processors may support simultaneous multi-threading, where the instructions passing down the pipeline 4 are each associated with a thread identifier identifying which hardware thread they belong to. In this case there is no need for a hardware thread identifier register 56, and instructions from multiple threads can be resident in the pipeline simultaneously so that the execute stage 16 may switch between different hardware threads at an instruction-by-instruction granularity. The hardware thread identifier associated with a given instruction may control which set of registers 14, 60 the instruction's operands are read from and may also control the write back stage 26 to select which set of registers 14, 60 is written with the result of the instruction.

Figure 2:
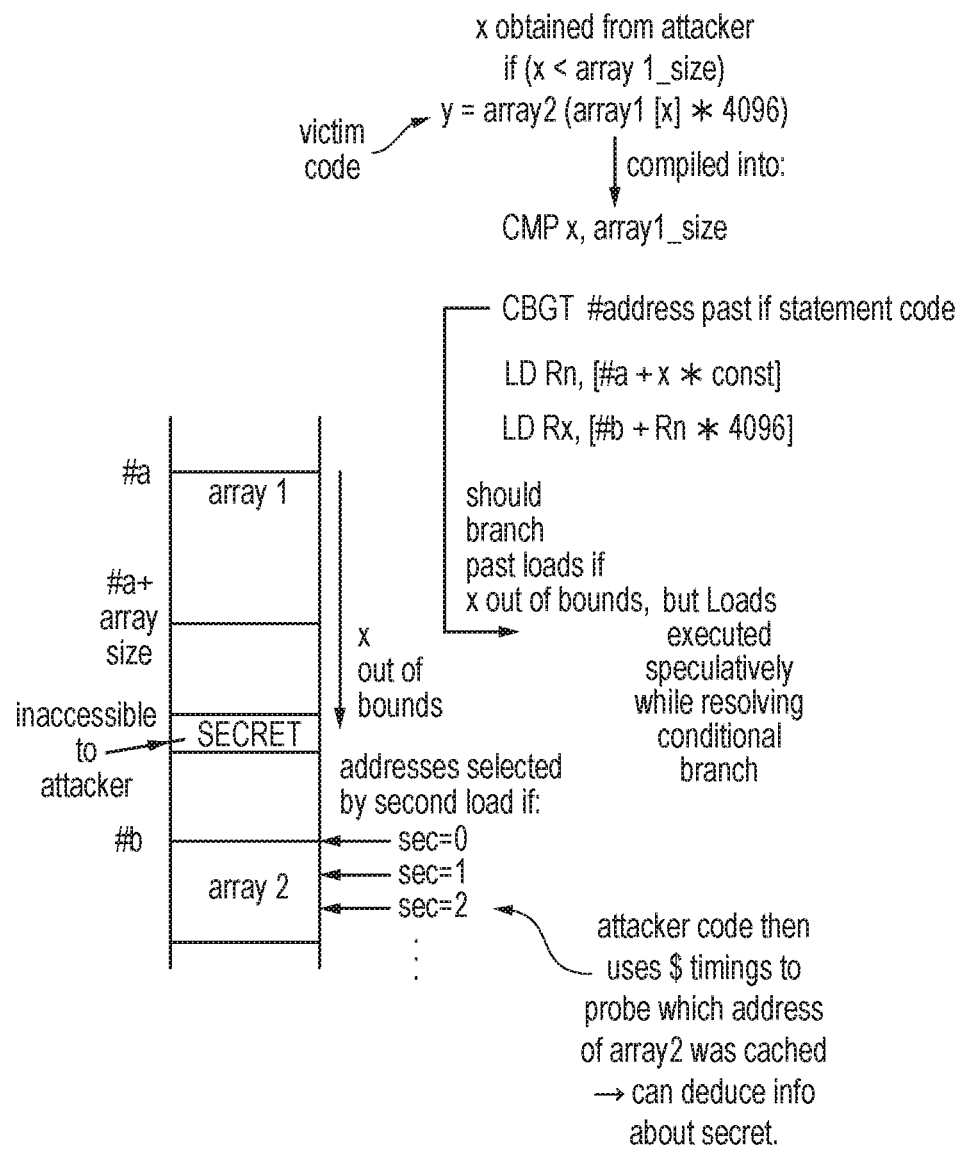
FIG. 2 illustrates an example of how an attacker could try to exploit the effects which speculatively executed instructions have on cache allocation to gain information about some secret data not directly accessible to the attacker.

The speculation mechanisms 40, 42 can help to provide high performance in a processor. However, as shown in FIG. 2, the effects of these speculation mechanisms on the cache 32 can be exploited by an attacker to learn information on secret data which may otherwise be inaccessible to the attacker. In the example of FIG. 2, the memory address space includes some secret data ("SECRET") which is inaccessible to the attacker's execution context but is accessible to a victim execution context. Consider a scenario where the victim code includes a function where a variable x obtained from another process is used to index into a first array of data (array 1) starting at address #a, and then the data value obtained from the index location in array 1 is itself used as an index into a second array of data (array 2) which starts at address #b. To ensure the validity of the memory access to array 1, the victim code includes an "if" statement which checks whether the value of x obtained from the other code is within a legal range (e.g. less than a defined size limit).

The functionality shown in high-level pseudo code at the top of FIG. 2 may be compiled into assembly code by a compiler, with the if instruction being mapped into a compare instruction which compares the variable x with the size limit for array 1 and sets condition status flags based on the comparison, followed by a conditional branch instruction which is intended to branch past the subsequent load instructions if the variable x is out of range. The subsequent load instructions load a value from array 1 based on the address calculated based on the variable x, and load from array 2 based on the address calculated based on the value read from array 1.

In a system having a branch predictor 40, the outcome of the conditional branch CBGT may be predicted by the branch predictor based on past outcomes of the branch. If the other codes passing variable x to the victim code generally behaves correctly, then the branch predictor 40 may learn that usually the conditional branch is not taken and the subsequent load instructions are executed. Hence, the processing pipeline may when executing the victim code execute the load instruction speculatively assuming that the conditional branch will be not taken, before the actual outcome of the conditional branch is known.

One way an attacker could try to gain information about the secret data may be to provide a value for the variable x which is outside the valid range for array 1 so that the address of the first load instruction calculated based on address #a and the variable x corresponds to the address of the secret data instead of residing in array 1. This will mean that when the victim code executes the subsequent load instruction which loads from array 2, this will load data into the cache 32 which has an address which depends on the secret. Hence, even if the secret data itself is inaccessible to the attacker's code, if the data from array 2 is accessible to the attacker's code then having subsequently switched back from the victim code to the attacker's code, the attacker could try accessing different addresses in array 2 and determine, based on the time taken to service the request, which of those addresses was allocated into the cache 32, as it may be expected that the address selected based on the secret would be accessed faster than other addresses not cached. Hence the cache timings could be used to probe which address of array 2 was cached and hence produce information about the secret. Even if array 2 itself is inaccessible to the attacker's code, if the attacker has already primed the cache 32 with some other data that is accessible to the attacker, then the detection of which address from array 2 was allocated into the cache could be made by detecting which other address is evicted to make way for the address from array 2, if the attacker has knowledge of the cache allocation scheme used by the cache (e.g. knowledge of which addresses mapped to the same set in a set-associative cache).

This is just one example of a way in which an attacker may be able to exploit a vulnerability caused by the fact that, if after a speculative window of processing that was resolved as a mis-speculation, any of the cache's state reflects what happened during the speculative window, so that a malicious agent can potentially extract privileged information by analysing timings of cache accesses. The example of FIG. 2 is based on speculation caused by branch prediction, but similar attacks may also be possible for other speculation mechanisms such as the load address predictor 42. Also, the out of bounds attack shown in FIG. 2 is just one way in which the attacker could exploit the vulnerability. Another approach could be that the attacker may maliciously train the branch predictor 40 so that a critical branch is mispredicted, leading to the cache being populated with data from an address which depends on the secret information.

A simple approach to defending against these types of attacks could be that the data read from the memory system in response to a speculatively executed load instruction could simply not be cached at all. However, this would be very poor for performance.

One seemingly simple solution to making sure an attacker cannot determine that a cache line was loaded by a speculative load would be to allow the cache to allocate data into the cache in response to the speculative load instructions as normal, the same as for non-speculative load instructions, but to keep track of addresses of the loads that were issued during a window of speculative execution, and then if the speculation is resolved as mispredicted then eviction requests could be issued for all of those load addresses. However, this approach may be insufficient to deal with the kind of attack where the cache was primed with data from a different array and the fact that accessing a certain address from that other array takes longer after the first part of the attack and can therefore leak information on which address was allocated into the cache dependent on the secret information. While this may require some detailed knowledge of the cache's placement and eviction policy, it could nevertheless be able to provide information on the secret. Hence, simply evicting lines of the cache after a mis-speculation is not enough as information may already have been exposed due to eviction of other data to make way for the data whose address depends on the secret.

Hence, the approach discussed below uses, as the basis of the mechanism to protect against the attack, the property of ensuring that the cache's non-transient state is not impacted by the effects of speculative loads that were the results of mis-speculation. In response to speculative load (read) operations, old lines in the cache are not evicted and new lines are not allocated in the main cache structure until the speculation condition has been resolved. However, caches may be associated with a shadow speculative buffer (SSB) 70 as shown in FIG. 1, which provides some transient cache storage for storing data allocated in response to a speculatively executed load instruction, until the speculation is resolved. Once speculation is resolved as correct then the data from the SSB 70 can be transferred into the corresponding cache. While data remains in the transient storage of the SSB 70, only the agent (execution context) that started the speculation may observe the presence of that data in the SSB 70 until the speculation is resolved. Hence, with the type of attack shown in FIG. 2, once the misprediction of the conditional branch is detected, then the speculatively allocated state in the SSB 70 may be discarded and the contents of the main cache structure 32, 34 may remain the same as if the speculation never happened, so that there is no change in which addresses were allocated into the cache 32, 34 which an attacker could exploit.

In the examples described below, a new hardware structure, called a shadow speculative buffer (SSB) is provided alongside each of the caches (most particularly data caches, but could also include TLBs, or line buffers). The SSB holds a number of speculative lines in a sort of a "shadow cache" until the speculative context completes. The size of the SSB may depend on the size of the speculative instruction window and the number of processor cores used in a particular implementation. The speculative cache lines may include at least the same state as a normal cache line.

New types of memory transaction are provided for maintenance of the speculation state of cache lines.

A mechanism for interacting with the SSB is provided that enforces that:

- all accesses (speculative or non-speculative) can observe normal (non-speculative) lines without any penalty;
- only certain speculative accesses (from allowed speculative contexts which share an execution context identifier with the context that allocated the data) can observe a speculative line;
- some other speculative accesses can be allowed to eventually observe a speculative line, but the first such access for a given context must suffer a delay penalty of a cache miss.
- it is possible to "promote" a speculative line to a normal (non-speculative) line without delay if the speculation is successful in any of the speculative contexts accessing this line.
- it is possible to promote a speculative line to a normal line if a non-speculative context requests the same line, but only after a delay that hides the fact that a speculative load caused the line to be fetched.

Figure 3:
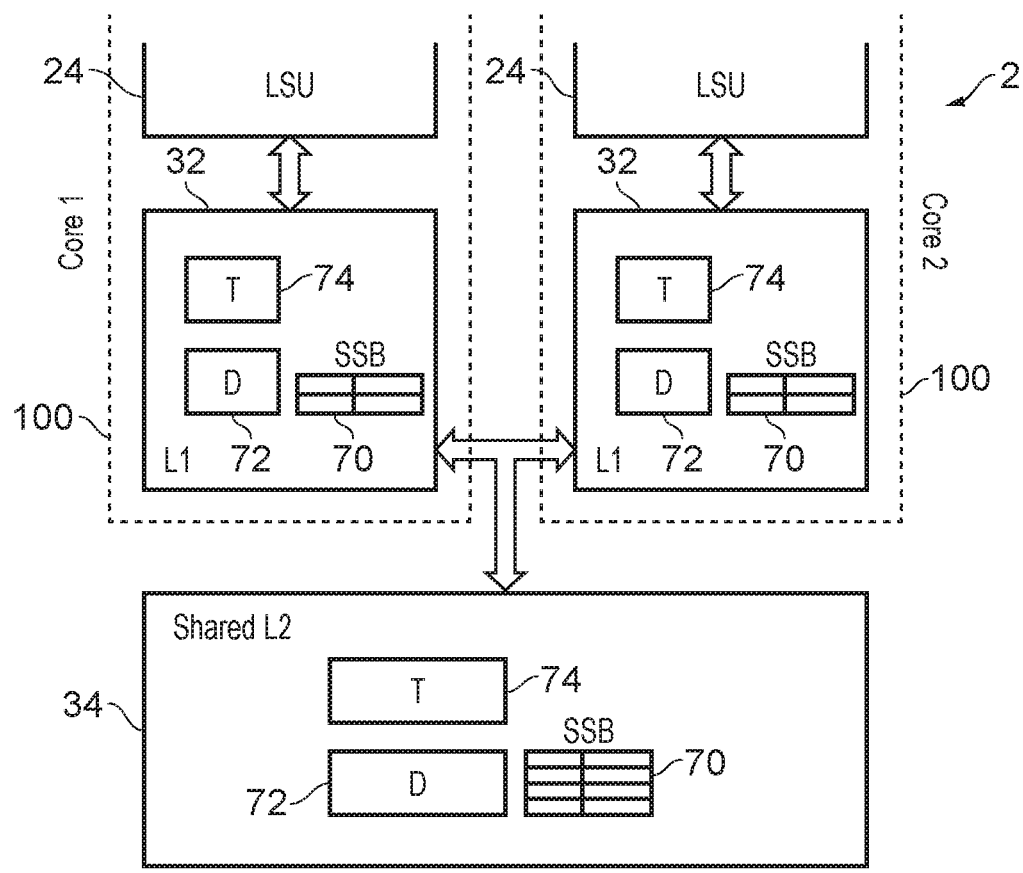
FIG. 3 shows an example of a speculative buffer associated with a cache.

FIG. 3 shows an example of providing speculative buffers 70 associated with different caches within a system. In the example of FIG. 3, the apparatus comprises multiple processor cores 100, with each core 100 being a processor having the features shown in the example of FIG. 1 (excluding the shared level 2 cache 34 and memory 36 which are shared between the cores). For conciseness, FIG. 3 only shows some components of each processor core 100 as indicated by the open ended dotted line showing that other parts of the core are not shown in FIG. 3. FIG. 3 illustrates the load store unit 24 and level 1 cache 32 provided for each of the processor cores. In this example, the level 2 cache 34 is shared between the processor cores 100 so that it is accessible by both cores.

Each of the caches (each core's private level 1 cache 32 and the shared level 2 cache 34) has a data array 72 and a tag array 74. The data array 72 stores the cached data while the tag array stores tag information for identifying properties of the associated data in the data array. For example the tag may record part of the address of the cache data, as well as other information such as indicating a coherency state of the data for managing coherency with other caches, or indicating eviction policy information for controlling which entry of the cache is evicted when new data needs to be allocated and there is no spare entry for accommodating the new data.

The data and tag arrays 72, 74 of the caches 32, 34 may operate according to a set-associative placement policy, where data from a given address can be placed in any one of a limited set of entries of the cache and cannot be placed in any other entries not in that set.

In contrast, the SSBs 70 may be a fully-associative buffer where data from a given address can be placed at any location within the buffer. Each entry of the SSB may be associated with an indication of the full corresponding address, in contrast with the tag array 74 of the cache 32, 34 which may specify only a tag portion of the address other than an index portion (the index portion is used to select which set of the cache the data is allocated to).

Hence, each cache is extended with a shadow speculative buffer for transient cache lines allocated into the cache in response to speculatively executed load instructions. The SSBs are relatively small compared to the main data array 72, but are provided with enough lines to maintain inclusivity. That is, the SSB 70 associated with the shared level 2 cache 34 may have sufficient entries to be able to accommodate all of the speculative entries allocated to the SSBs 70 of the respective level 1 caches 32 in each of the processor cores 100.

In some examples, the size of a level 1 SSB associated with a given level 1 cache 32 may be selected to have a number of entries corresponding to the number of instructions processed within the maximum speculation window supported by the corresponding core 100, so that even if speculative execution looks ahead of the last committed instruction by the maximum number of instructions supported, and every instruction within that speculation window is a load instruction specifying a different address, then the SSB would be able to accommodate speculative entries to handle all of the addresses specified by each of these load instructions.

Alternatively, in other examples the number of entries in a given level 1 SSB may be selected to be smaller than the maximum number of instructions that can be processed within the speculation window of the corresponding core 100. In this case, if the level 1 SSB becomes full, then the corresponding core 100 may halt speculative execution until, upon resolving speculation for an earlier instruction, an SSB entry has been freed by promoting it to the cache (if the speculation was correct) or by invalidating the SSB entry (if the speculation was incorrect).

The SSBs 70 may have support for a coherency protocol the same as the cache and so may indicate a coherency state for each entry, similar to the lines in the main cache structure.

While the cache may evict entries when needed to accommodate other data, the SSB 70 may not need to perform such eviction and replacement on a cache miss. Instead, eviction from the SSB 70 may be performed at the end of a speculation window. Hence, it may not be necessary for SSB entries to maintain eviction policy information or replacement information such as least recently used.

Each entry in the SSB 70 may be tagged with a tagged execution context identifier which is derived from one or more pieces of identifier information associated with the execution context which caused the corresponding speculative entry to be allocated into the SSB 70.

Figure 4:
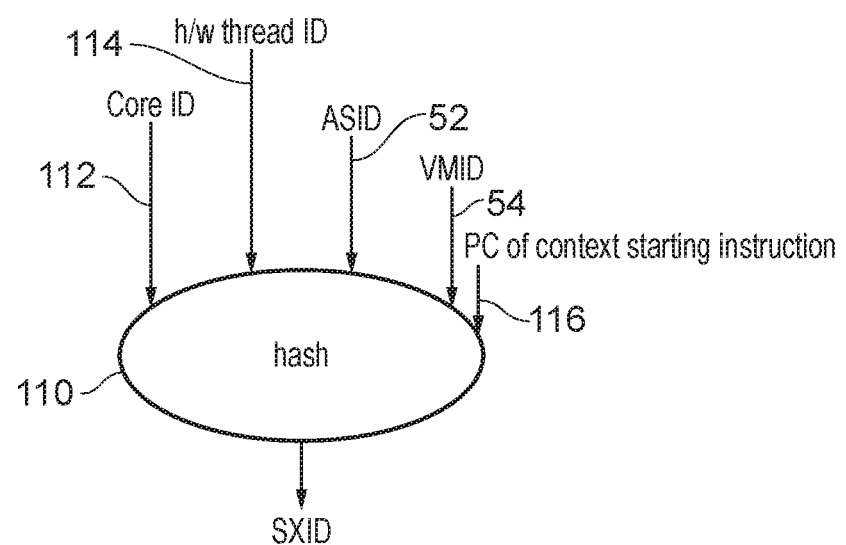
FIG. 4 illustrates an example of determining an execution context identifier for tagging entries in the speculative buffer.

FIG. 4 shows an example of how the execution context identifier (referred to below as a speculative execution identifier, or SXID) can be determined for a given execution context. In this example the SXID is calculated based on a hash function 110 applied to a number of pieces of information associated with the execution context. These pieces of information could include a core identifier 112 indicating which processor core 100 the execution context was executing on; a hardware thread identifier 114 which may indicate which of the hardware threads the execution contexts corresponds to (for example this could be derived from the hardware thread identifier register 56 shown in FIG. 1 or from a hardware thread identifier associated with the speculative load instruction which caused a load request to be issued speculatively to the cache); the address space identifier 52 described above; the virtual machine identifier 54 described above; and a program counter address 116 representing the address of the instruction which caused execution of a speculative block of instructions of the execution context to be started (e.g. this could be an address of a branch instruction for which a prediction made is controlling the speculative execution of the speculative block). Where the program counter address 116 is used, this address may be a virtual address. Any subset of one or more of these pieces of information 112, 114, 52, 54, 116 could be hashed together by any desired hash function to generate the execution context identifier SXID. Alternatively, the hash function could simply be a concatenation of parts of these identifiers. It is not essential for all of the types of information shown as input to the hash 110 in FIG. 4 to be used in a particular implementation.

Hence, in general an identifier associated with a particular execution context is derived and this is used to tag each entry allocated by that execution context into the SSBs 70. This can then be used to control lookups into the cache so that if another actor from any other speculative context tries to access a line allocated speculatively into the SSB 70 then access to that line is denied and the cache line may be evicted from the SSB 70 and also from the SSB 70 associated with any other downstream caches, so that the access will need to refetch data from memory and so is serviced as if the request missed in the overall cache structure. This ensures that only the execution context which caused a speculative line to be allocated can observe the presence of that speculatively executed data until the speculation is resolved.

If a given execution context identifier (SXID) is reused (e.g. a previously executed process is terminated and that process's SXID is reallocated to a different process), then the SSBs 70 may invalidate at least those speculative entries for which the tagged SXID matches the reused SXID. In some implementations, an invalidation request specifying the reused SXID may be issued, so that the SSBs 70 may invalidate the speculative entries associated with that specific SXID and do not need to invalidate speculative entries specifying other SXIDs. To avoid needing to send multiple invalidation requests for each separate address, it can be useful to support a speculative-invalidate-by-SXID request which requests that the SSBs 70 invalidate all speculative entries associated with a target SXID regardless of which address those speculative entries relate to. Alternatively, other implementations may simply invalidate all speculative entries from the SSBs 70 when an SXID is reallocated to a different execution context, regardless of whether the invalidated entries relate to that SXID or not, to simplify circuit implementation. Either way, this ensures that when an SXID is reallocated then it is not possible for the new process associated with that SXID to hit against speculative entries in the SSBs that were allocated by a different process that previously used the same SXID.

Figure 5:
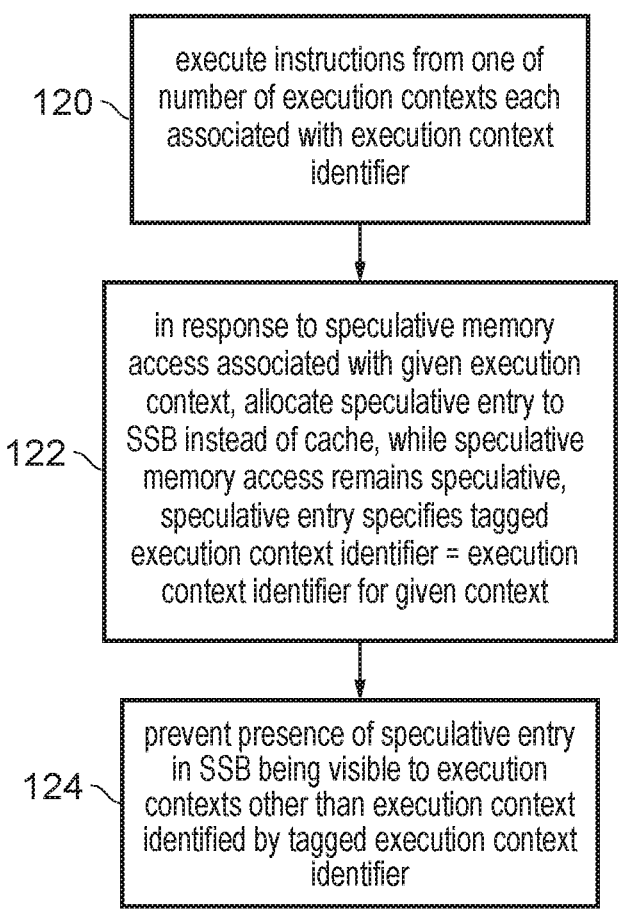
FIG. 5 is a flow diagram showing a method of using the speculative buffer to prevent data allocated to a cache in response to speculative memory accesses being visible outside the execution context which allocated the data.

FIG. 5 shows a flow diagram illustrating a method of controlling caching in response to speculatively executed instructions. At step 120 the processing pipeline 4 of a given processor core 100 executes instructions from one of a number of execution contexts each associated with a respective execution context identifier. While executing the instructions, speculation mechanisms are used to control speculative execution of instructions and/or speculative fetching of data into the cache. For example, the speculation may be based on the branch prediction provided by the branch predictor 40 and/or on address prediction provided by the load address predictor 42. Other speculation mechanisms could also be used to control the speculation.

At step 122 a speculative memory access is performed associated with the given execution context. In one example, the speculative memory access could be generated in response to the load store unit 24 speculatively executing a load instruction which triggers a speculative memory access request to be issued from a given execution context. In another example, a prefetch-triggered load request may be issued by the load address/predictor/prefetcher 42. As the memory access is a load issued speculatively, the entry for the requested target address is allocated to the SSB 70 instead of to the cache 32, while the speculative memory access remains speculative. The allocated entry in the SSB 70 for the level 1 cache 32 specifies, as a tagged execution context identifier, the execution context identifier for the given execution context associated with the speculative memory access. As well as allocating to the SSB 70 of the level 1 cache 32, when an inclusive cache policy is used then the entry may also be allocated into the SSB 70 of downstream caches such as the shared level 2 cache 34.

At step 124 the cache 32 ensures that the presence of a speculative entry in the SSB 70 is prevented from being visible to execution contexts other than the execution context identified by the tagged execution context identifier associated with that entry.

Figure 6:
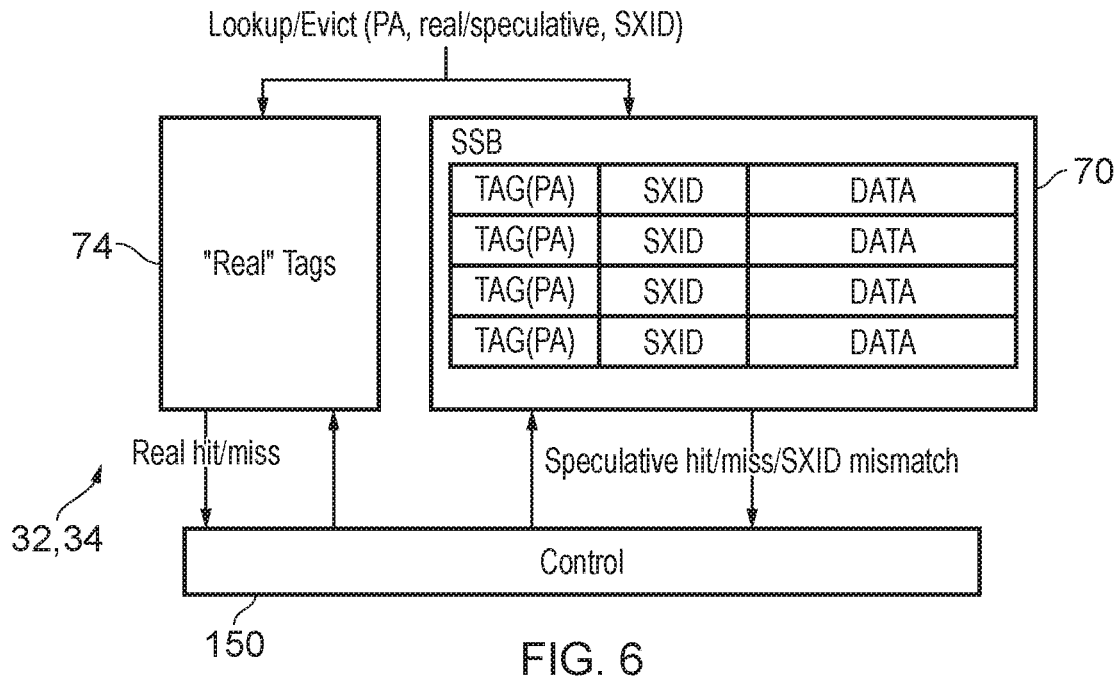
FIG. 6 shows an example of control circuitry for controlling lookups to the cache and speculative buffer.

FIG. 6 shows an example of cache control circuitry 150 that can control access to the main cache structure and SSB 70 associated with a given level of cache 32, 34. When receiving a read request to read data from the cache 32, 34, the control circuitry 150 may control parallel lookups into the tag array 74 of the main cache structure and the SSB 70. The cache lookup into the tags 74 of the main cache structure is based on the target address (PA) of the lookup, while the SSB 70 is looked up for speculative accesses based on the target address PA and the execution context identifier SXID specified in the request. The target address (PA) used to look up the main cache structure and the SSB 70 is a physical address in this example. The control circuitry 150 analyses whether the request hits in the main cache structure and/or in the SSB 70. The control circuitry 150 also detects for an SSB lookup whether the address hits against an entry specifying the same SXID as the requested SXID or an entry with a different mismatching SXID compared to the requested SXID.

Figure 7:
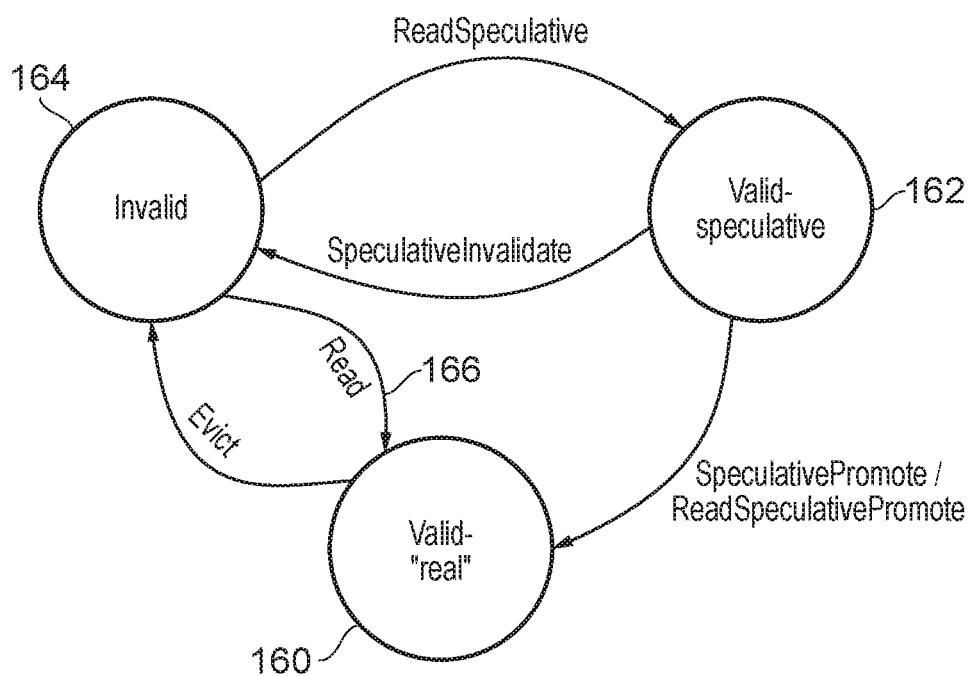
FIG. 7 shows state transitions for a cache line between states indicating whether the cache line is allocated in the cache or the speculative buffer.

As shown in FIG. 7, the presence of the SSB 70 means that a given cache line now may have one of two types of "valid" state in the cache: "valid-real" 160 and "valid-speculative" 162. A cache line is considered valid-real when it is cached in the main cache structure 72, and valid-speculative when it is cached in the SSB 70. These states may be separate from any sharing (coherency) states which may provide further states orthogonal to the state shown in FIG. 7. FIG. 7 also shows an invalid state 164 which a given cache line has when it is not cached in either the main or shadow structures 72, 70.

The memory system protocol or coherency protocol used to convey messages between the LSU 24 and the caches and between different caches may be extended to provide a number of transaction types for controlling transitions between the respective states 160, 162, 164 shown in FIG.

7. A non-speculative read request 166 may cause a transition from invalid 164 to valid-real 160 allocating data into the main cache structure 72, 74. An eviction request (e.g. triggered by a cache invalidation instruction executed by the pipeline or by eviction caused by data being replaced by other data in response to a read request) may trigger a transition back from valid-real 160 to invalid 164.

In addition, the following transaction types for triggering transitions involving SSB entries may be provided:

1. ReadSpeculative(ADDR, sxid)—read a line into the shadow speculative buffer 70, unless the line is already present in the "real", non-speculative cache 72. The response message may indicate whether this was a "real" hit or a non-speculative hit, so that further speculative state maintenance transactions can be filtered out for "real" hits. The cache line transitions to Valid-speculative. For example, the ReadSpeculative transaction could be issued by the processor core in response to a speculatively executed load instruction, or as a prefetch request issued by the prefetcher 42 to request prefetching of an address predicted based on prefetcher state.

2. SpeculativePromote(ADDR, [sxid])—move the line from the shadow speculative buffer 70 into the real cache 72 in this cache, any peer caches and any downstream caches. If the line is no longer present at a cache level, re-fetch it from the downstream cache (using ReadSpeculativePromote). This does not impact any caches that hold the line in a non-speculative state. The cache line transitions to Valid-real. It is not essential for sxid to be specified in the SpeculativePromote request—if omitted, the line is moved from the shadow speculative buffer into the real cache regardless of which sxid is specified by the tagged sxid in the speculative buffer entry, while if sxid is specified then only SSB entries with a tagged sxid matching the target sxid of the SpeculativePromote request are promoted into the cache. The SpeculativePromote transaction could be issued by the processor core upon resolving speculation for a previously issued speculative memory access. For example, when a branch instruction has been resolved as correctly predicted, SpeculativePromote requests could be issued for any addresses specified by load instructions executed within a basic block of instructions executed between the correctly predicted branch instruction and a subsequent branch instruction.

3. ReadSpeculativePromote(ADDR, sxid)—move the line from the shadow speculative buffer 70 into a real cache 72 in this cache, any peer caches and any downstream caches, re-fetching the data if required, and also return the data to the requester. The cache line transitions to Valid-real. For example, the ReadSpeculativePromote transaction can be issued by a level 1 cache/SSB to a level 2 cache/SSB when a SpeculativePromote transaction has missed in the level 1 SSB.

4. SpeculativeInvalidate(ADDR, sxid)—remove the line from the shadow speculative buffer 70 in this cache, any peer caches and any downstream caches. If a cache line is evicted from a speculative buffer 70, the cache line transitions to Invalid. However, this doesn't impact any caches that don't hold the line at all (Invalid) or that hold it in a non-speculative state (Valid-real). For example, the SpeculativeInvalidate transaction specifying a given address ADDR can be issued by the processor core 100 after detecting that speculation was incorrect for a speculative memory access specifying ADDR.

Note that speculative versions of write requests are not provided in the above example, because while a processor core typically may be speculatively allowed to read data, speculative writes in some processor cores may already not be allowed to be seen by the memory system (including any caches in the hierarchy) until speculation is confirmed as correct. The store buffer 44 may buffer up speculative store data until speculation is resolved. This is typically done to limit the overhead of dealing with a mis-speculation since by preventing store data being propagated out to the caches and memory then this avoids the need to try to reverse any speculative changes in state if a store instruction is mis-speculated. Hence, write operations may typically be less vulnerable to the type of attack shown above, compared to read operations.

Nevertheless, in other examples which do not provide the store buffer 44 and allow speculative writes to pass speculative data to the memory system before the speculation is resolved, then the SSB could also be extended to buffering data allocated speculatively for write requests.

Figure 8:
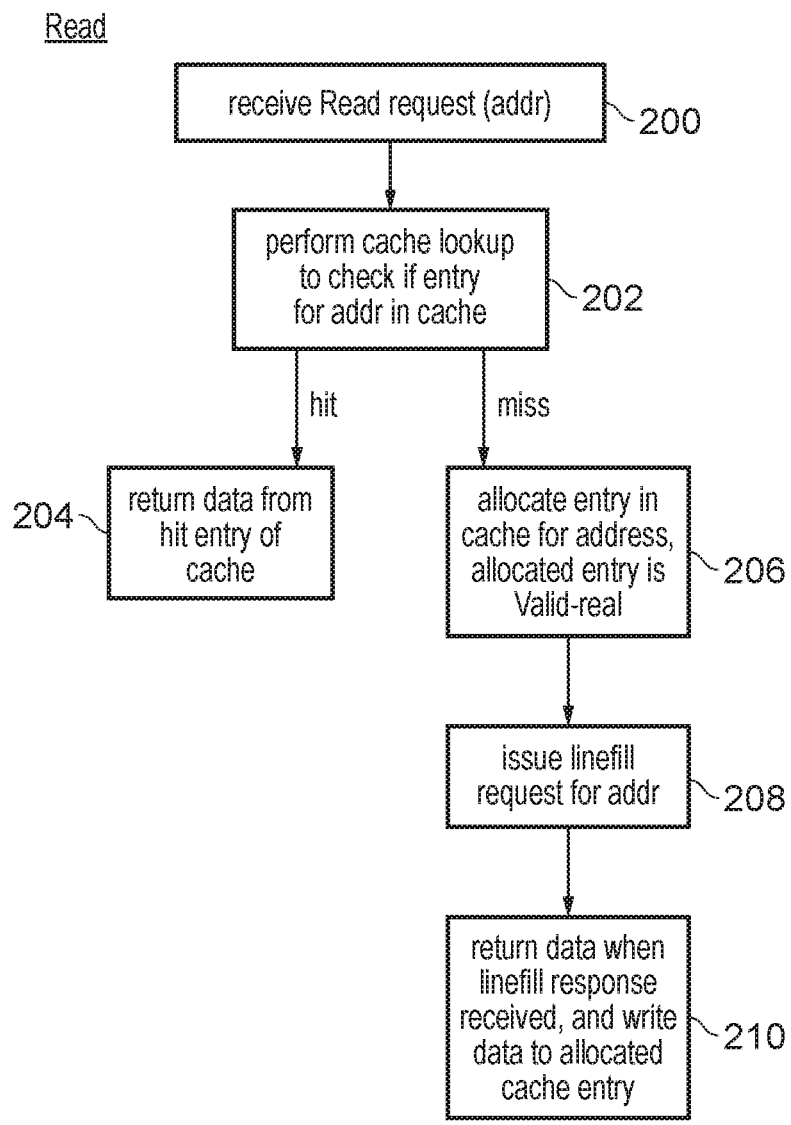
FIG. 8 is a flow diagram showing processing of a read transaction.

FIG. 8 shows a flow diagram showing processing of a non-speculative read request. At step 200 a given cache 32, 34 receives the non-speculative read request, which specifies a target address, addr. At step 202 the control circuitry 150 associated with that cache performs a cache lookup using the tag array 74 to check if the data array 72 of the main cache structure includes an entry corresponding to the target address. If an entry with a tag matching the target address is detected, then a cache hit occurs and at step 204 the data from the hit entry of the main cache array 72 is returned to the requester in response to the read request, and there is no change in cache allocation.

If the cache lookup detected a cache miss, where none of the existing entries in the main cache structure 72 have a tag matching the target address, then at step 206 an entry is allocated into the main cache structure 72 for the target address, with the entry being allocated in the Valid-real state 160. The selection of which entry to replace may be based on a replacement policy, such as round robin or least recently used. At step 208 the control circuitry 150 issues a linefill request to a downstream cache such as the shared level 2 cache, or to main memory if the cache is already the last level cache. At step 210, when the data is returned from the downstream cache or memory in a linefill response, the data is written into the cache entry which was allocated at step 206. The newly allocated cache entry will be visible to all execution contexts which are permitted by the page tables in the MMU 28 to access the target address. Hence, when looking up the main cache structure there is no restriction based on the execution context identifier, SXID, associated with the execution context which issued the request.

Figure 9:
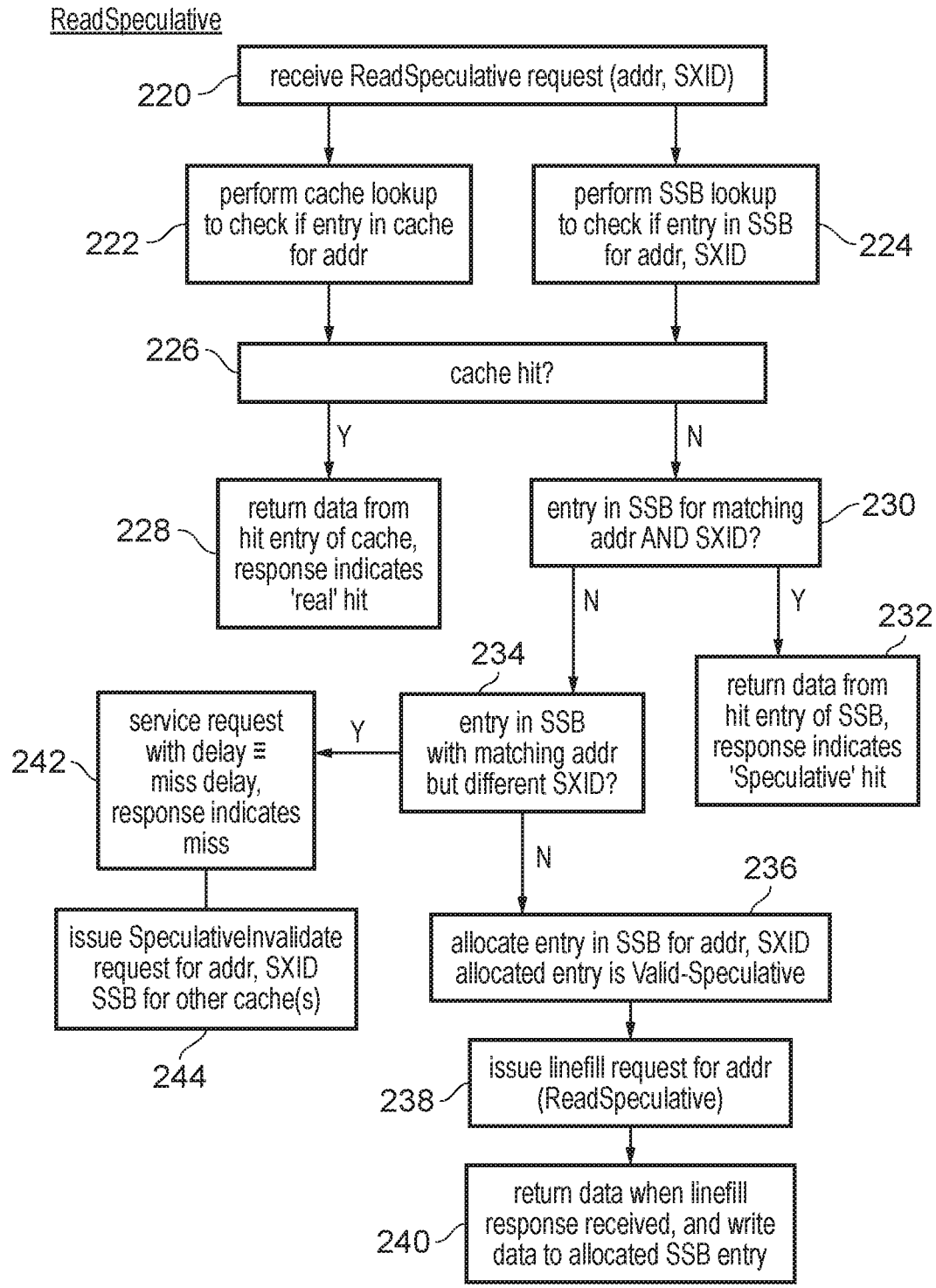
FIG. 9 shows an example of processing a speculative read transaction.

FIG. 9 shows processing of a ReadSpeculative request received at a cache. At step 220 the cache 32, 34 receives a ReadSpeculative request specifying a target address addr and a target execution context identifier SXID. In response to the ReadSpeculative request, at step 222 the control circuitry 150 performs a cache lookup the same as at step 202 of FIG. 8, and also at step 224 the cache control circuitry 150 performs a SSB lookup to check if a speculative entry in the SSB 70 specifies a tagged address matching the target address and a tagged SXID matching the target address SXID specified in the ReadSpeculative request. The SSB lookup at step 224 can be performed in parallel with the cache lookup at step 222, to improve performance. In the SSB lookup at step 224, the control circuitry 150 generates a first signal indicating whether there was a hit or miss is detected, and a second signal indicating, if there is a hit, whether the target SXID matches or mismatches the tagged SXID for the entry having the matching tagged address.

At step 226 the cache control circuitry 150 determines whether the cache lookup identified a cache hit in the main cache structure 72, 74, and if so, then at step 228 data is returned from the hit entry of the cache the same as at step 204. However, for the ReadSpeculative request, in addition to returning the data from the hit entry of the main cache structure, the response providing the read data to the requester may also indicate that this data was a real hit in the main cache, as opposed to a speculative hit in the SSB. For example, an identifier in the read response may indicate that a real hit was detected.

If there was a cache miss then at step 230 the cache control circuitry 150 determines whether the SSB 70 includes an entry which has both a matching address and a matching SXID for the target address and target SXID specified in the read speculative request. If there is a match for both address and SXIB, then at step 232 the cache control circuitry 150 controls the data stored in the hit entry of the SSB which had both the address and SXID matching to be returned to the requester which sent the ReadSpeculative request. However, in contrast to step 228, the read response in step 232 indicates that this data was returned following a speculative hit, rather than a real hit. Although not essential, it can be useful for the read response to a ReadSpeculative request to indicate whether the hit was in the main cache or in the SSB, because this can allow some subsequent messaging to be suppressed if a real hit was detected. For example, if a real hit is detected then it may not be necessary at the end of a speculation window to issue a speculative promote request as discussed further below. This can save some bandwidth in communications between different levels of caches or between the load/store unit 24 and the level one cache 32.

If at step 230 it is detected that the SSB did not contain an entry where the tagged address and tagged SXID matched the requested address and SXID, then at step 234 the control circuitry detects whether there is an entry in SSD which has a matching address but for which the tagged SXID is different to the target SXID of the request. If not, there is a miss in both the cache and the SSB and so at step 236 a new speculative entry is allocated into the SSB for the target address and target SXID. Hence the target SXID specified in the request is recorded as the tagged SXID for the newly allocated entry in the SSB. The newly allocated entry has a cache line state of Valid-speculative 162, to indicate that this entry was allocated by a speculative request in contrast to the Valid-real entry allocated into the main cache at step 206 of FIG. 8. Note that the Valid-speculative and Valid-real states do not necessarily need to be associated with respective state identifiers as they could also be indicated simply by the presence of an entry either in the main cache structure or the SSB. Other examples may maintain some tracking information to indicate which of the cache and the SSB records the information for a given address which could be used to save power by eliminating one or other of the cache lookup and the SSB if desired. The approach taken may be a trade-off between performance (where both structures are looked up in parallel) and energy efficiency (which could be more efficient if only one structure needs to be looked up).

Having allocated the SSB entry, then at step 238 a linefill request for the target address is issued to a downstream cache. The linefill request may be issued as a further ReadSpeculative request which may be issued to a downstream cache or to main memory, so if this causes allocation into the downstream cache then this may also trigger a speculative allocation into the SSB 70 associated with the downstream cache, instead of a non-speculative allocation into the main cache structure of the downstream cache. At step 240, when a linefill response is received from downstream then the data returned is written to the newly allocated SSB entry in the SSB 70.

If at step 234 an entry was detected in the SSB as corresponding to the target address, but which specifies a tagged SXID which is different to the target SXID specified in the received ReadSpeculative request, then at step 242 the ReadSpeculative request is serviced with a delay equivalent to the delay which would have been occurred on a miss in the SSB if steps 236 to 240 has been taken. This can be achieved in different ways. In one example, at step 242 the data from the hit entry of the SSB can be returned to the requester in the same way as at step 232, except that an additional delay is simulated so that even though the data is already available, it is not returned until after the simulated delay has elapsed. The simulated delay may be designed to be equivalent to the delay which may be expected on average when a miss occurs in the SSB and the linefill request actually has to be issued to downstream memory. This would allow the execution context which issued the ReadSpeculative request to be unaware that the entry has already been allocated into the SSB 70 by a different execution context.

Alternatively, at step 242 if there is already an entry in the SSB for the same address but a different SXID, then that entry can be evicted from the SSB 70. A new entry can be allocated for the target address and target SXID, and a linefill request issued, the same if there had actually been a miss and steps 236-240 were taken. This may effectively simulate the miss delay by actually incurring the cost of the miss.

Either way, the read speculative request is serviced so that eventually the data is returned to the requester after a delay which is similar to the delay encountered on a miss, so that the presence of the speculatively allocated entry caused by a different execution context cannot be detected outside of that context. Also, at step 244, a SpeculativeInvalidate request is issued specifying the target address and target SXID of the ReadSpeculative request, which is issued to the speculative buffers associated with any other caches in the system so that they also invalidate entries associated with the target address and the target SXID. This ensures that other caches will also invalidate entries associated with the target SXID and target address so that only one execution context can have the speculative buffer entries associated with a given address at a time, to reduce the scope for one execution context to learn the information about speculative activity of another before the speculation has been resolved.

Figure 10:
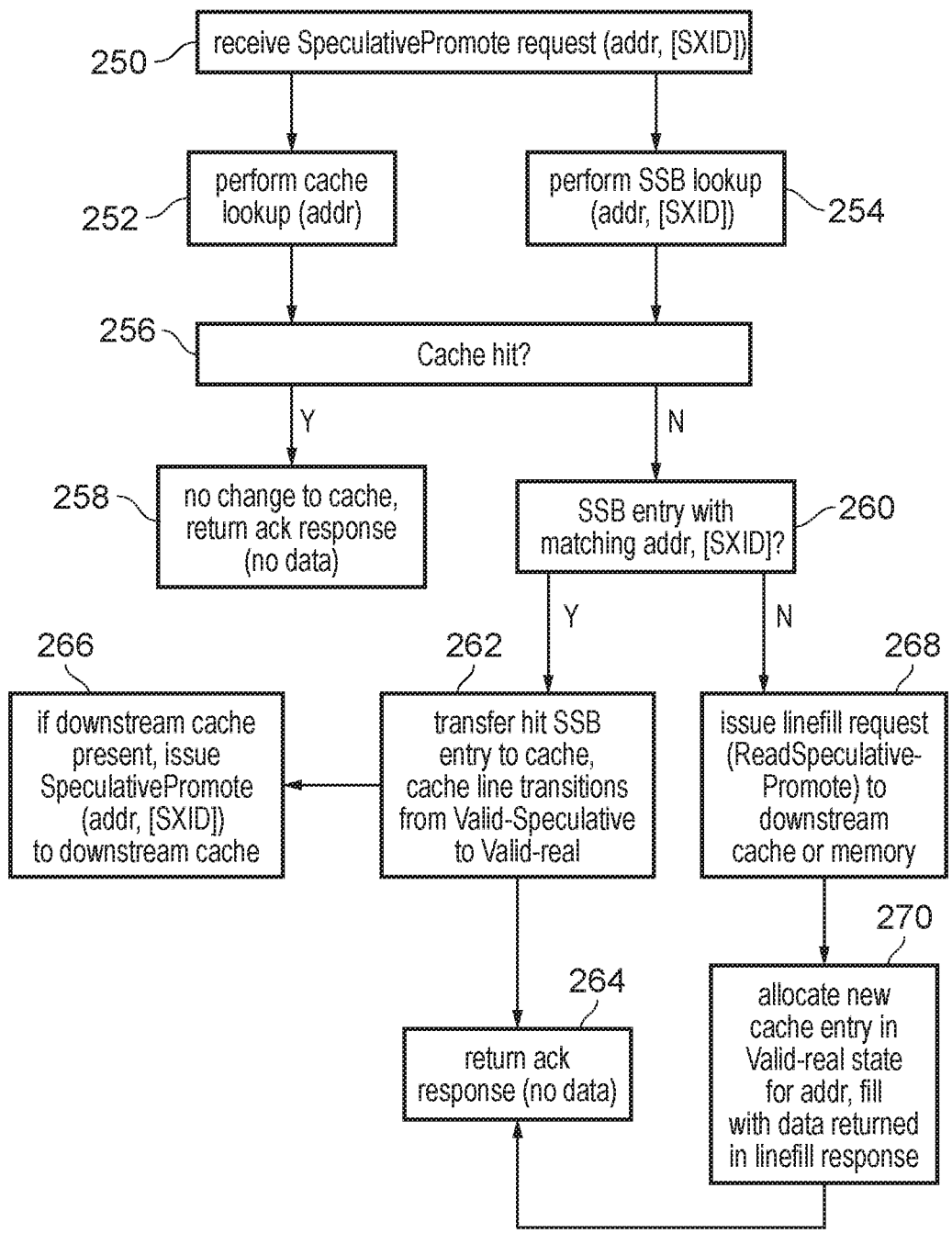
FIG. 10 shows an example of processing a speculative promote transaction.

FIG. 10 shows a flow diagram illustrating processing of a SpeculativePromote request. The SpeculativePromote request can be issued by the processor core when speculation is resolved as correct for a previously speculatively executed load instruction. At step 250 the cache at a given cache level 32, 34 receives a SpeculativePromote request and in response at step 252 and 254 the cache lookup and SSB lookup are performed in the same way as at steps 222 and 224 of FIG. 9. At step 256 the cache control circuitry detects whether there was a cache hit in the main cache structure and if so then at step 258 no change to the cache allocation is necessary and an acknowledgement response is returned. The acknowledge response does not need to provide any data as the SpeculativePromote request does not request an actual read, but is merely intended to enable transfer of a speculative entry into the main cache structure.

If there was a cache miss detected then at step 260 the cache control circuitry 50 detects whether the SSB 70 includes an entry for which the tagged address matches the target address specified in the SpeculativePromote request (and, if the SpeculativePromote request specifies a target SXID, whether the tagged SXID matches the target SXID of the SpeculativePromote request). If so then at step 262 the hit SSB entry is transferred to the main cache structure, so that the data from that entry is allocated into the main data array 72 and the tag array 74 is updated based on the target address in the SSB entry. The hit SSB entry can then be invalidated. The cache line associated with the target address transitions from the Valid-speculative state 162 to the Valid-real state 160. At step 264 an acknowledgement response providing no data is again returned. Also, at step 266 if the cache processing the SpeculativePromote request is not a last-level cache and so at least one downstream cache is present, then at step 266 a further SpeculativePromote request is issued to the downstream cache so that it can also promote any SSB entry for the target address and target SXID to its main cache structure.

If at step 260 it was detected that the SSB 70 did not contain an entry with the tagged address and SXID matching the target address in the SXID, then this may indicate that another execution context caused a speculative allocation into the SSB during the speculation window before the SpeculativePromote request was issued (and causing invalidation of the SSB entry that had the tagged address and SXID matching the target address and SXID of the SpeculativePromote request). To ensure that the execution context associated with a target SXID of the SpeculativePromote request cannot detect the fact that this invalidation occurred, at step 268 a linefill request is issued to any downstream cache or memory to request that the data from the target address is fetched back into the cache structure, and at step 270 when this data is returned in a linefill response then this is allocated into a new cache entry in the main cache structure 72, with that cache line then transitioning to the Valid-real state 160. The linefill request issued at step 268 may be issued as a ReadSpeculativePromote request, which will be described further below with respect to FIG. 11. Hence, regardless of the outcome of the SpeculativePromote request, the main cache structure will then subsequently contain the data associated with a target address so that when the execution context associated with a target SXID subsequently accesses the same data again then it does not see any difference in cache timings depending on whether the data was previously in the main cache, the SSB or neither. This limits the information that an attacker can derive about operation of other execution contexts.

Also, at step 268, if the SSB already included an entry for the target address which specifies a mismatching tagged SXID (different to the target SXID), then that entry is evicted from the SSB.

Figure 11:
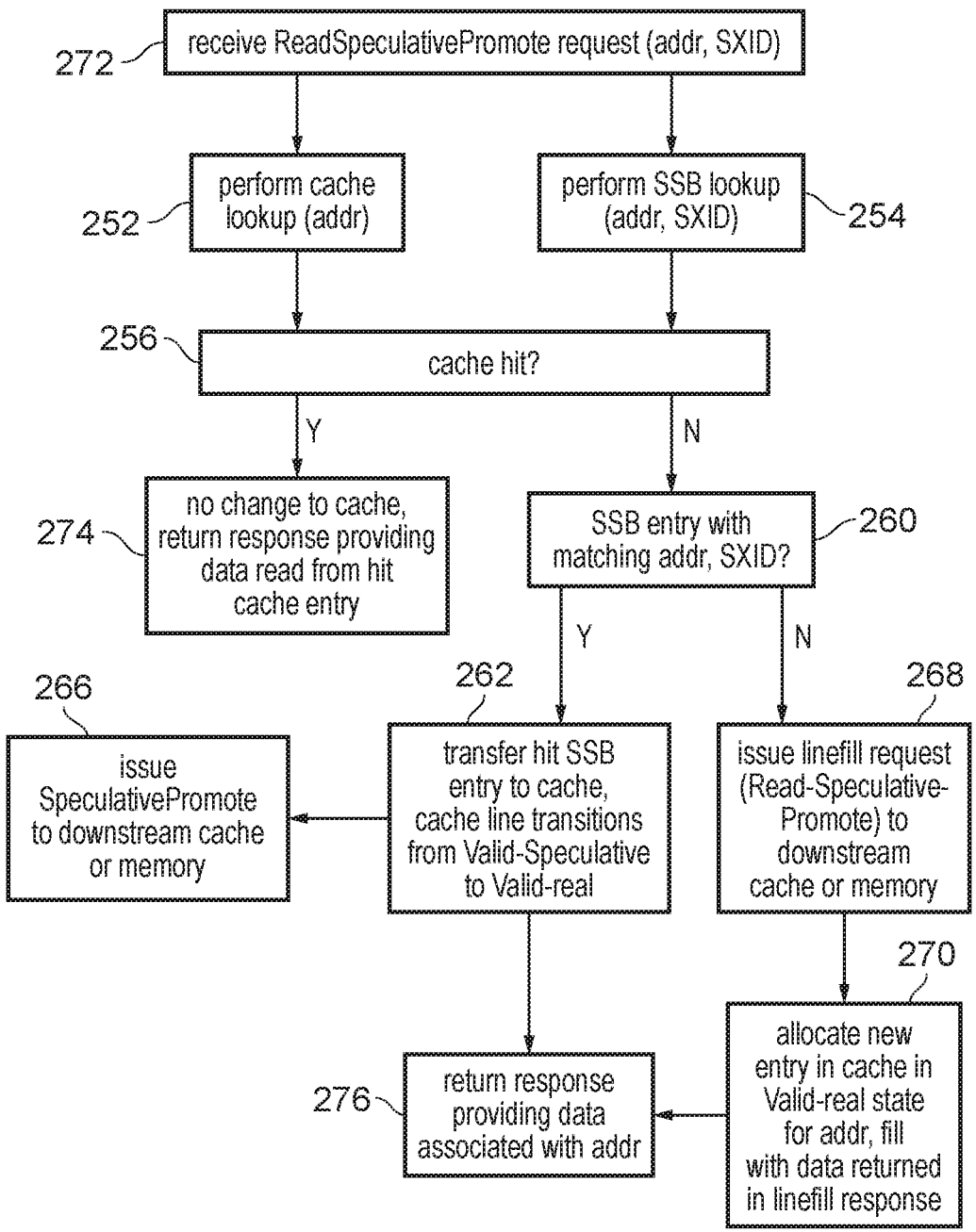
FIG. 11 shows an example of processing a read speculative promote transaction.

FIG. 11 shows a flow diagram showing processing of a ReadSpeculativePromote request specifying a target address and target SXID. The ReadSpeculativePromote request is processed in substantially the same way as the SpeculativePromote request shown in FIG. 10, with some differences as follows. At step 260 of FIG. 11, matching of the target SXID with the tagged SXID is required for there to be a hit in the SSB, unlike at step 260 of FIG. 10 where matching of the SXIDs is optional. At step 272 of FIG. 11, a ReadSpeculativePromote request is received instead of the SpeculativePromote request as shown in step 250. In response, all of the steps of FIG. 11 are the same as the corresponding steps of FIG. 10, with the exception that step 258 is replaced with step 274 and step 264 is replaced with step 276 in FIG. 11. The other steps of FIG. 11 are shown with the same reference numerals as the corresponding steps of FIG. 10 and perform the same functions.

Steps 274 and 276 of FIG. 11 differ from the corresponding steps 258 and 264 in that the response provided to the requester provides the data read from the corresponding SSB entry transferred to the cache, or received in the linefill response from a downstream cache or memory, rather than merely acknowledging the request as for SpeculativePromote. Hence, the ReadSpeculativePromote is a special type of SpeculativePromote request which in addition to promoting any additional speculative line from the SSB to the cache or refetching from the data downstream if necessary, also returns the data to the requester. By supporting a ReadSpeculativePromote transaction this makes the memory bandwidth usage more efficient because at step 268 of FIG. 10 it is possible to issue a single request which both promotes any speculative entry from the SSB to the main cache structure in a downstream cache and also returns the data so that a SpeculativePromote transaction received at an upstream cache can allocate data previously evicted from the SSB to its main cache structure, avoiding the need for two separate transactions (one for reading the data from downstream and one for promoting the speculative entry in the downstream cache to the main cache structure).

Figure 12:
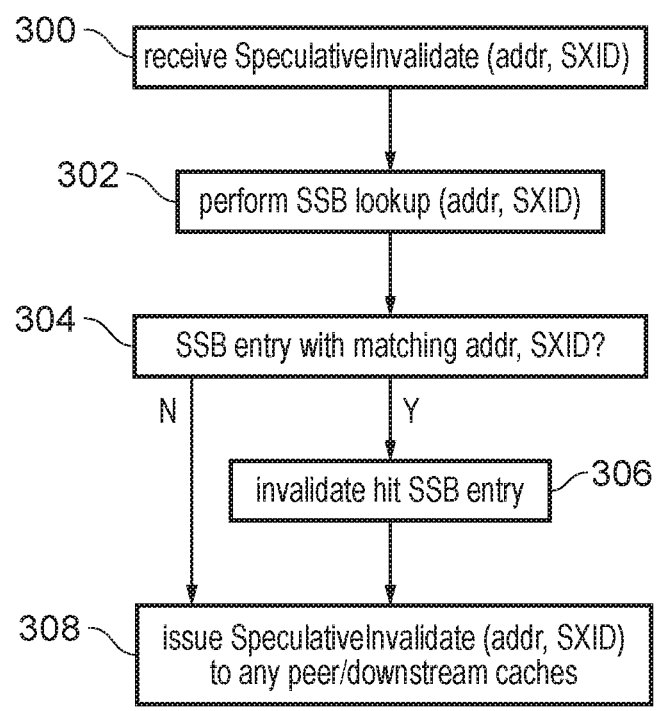
FIG. 12 shows an example of processing a speculatively invalidate transaction.

FIG. 12 shows processing of a SpeculativeInvalidate request, which can be issued by a processor core when it is detected that speculation was incorrect for a given speculatively executed load instruction. The SpeculativeInvalidate request may specify the target address of the incorrectly speculated load and a target execution context identifier (SXID) associated with the context in which that load was executed. At step 300 a given level of cache receives the speculative invalidate request. In response, at step 302 the control circuitry 150 performs an SSB lookup in the SSB to check whether there is any entry having a tagged address and tagged SXID which matches the target address and target SXID respectively. If at step 304 a hit SSB entry, for which both the tagged address and tagged SXID match the corresponding target address and target SXID, is detected, then at step 306 that entry is invalidated and the data discarded from the SSB. If there was no SSB entry with a matching target address and SXID, then step 306 is omitted. Regardless of whether step 306 is performed or not, at step 308 a further SpeculativeInvalidate request specifying the target address and the target SXID is issued to any peer caches at the same level as the current cache or downstream caches located further downstream closer to memory, so that they can also invalidate any entries associated with the misspeculated read operation.

Figure 13:
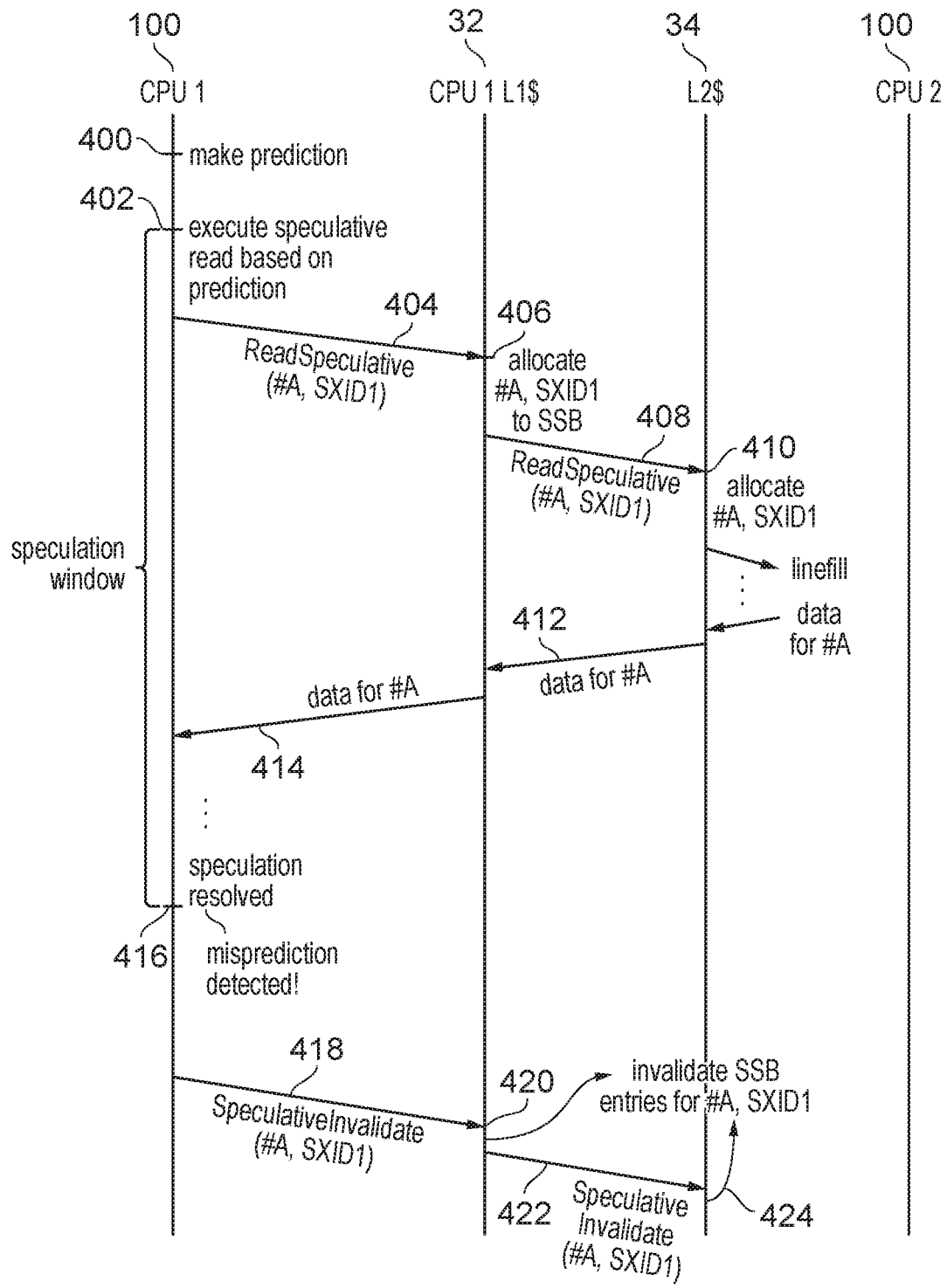
FIG. 13 shows an example of using the read speculative transaction and speculative invalidate transaction in a scenario where a misprediction is detected following a speculative read operation being performed during the speculation window.

FIG. 13 shows a first example of using some of the transaction types shown above. FIG. 13 shows messages exchanged between a first processor core 100, the level one cache 32 associated with that core and the shared level two cache 34. The presence of a second processor core 100 is also shown but in this example that core does not perform any relevant activity regarding the addresses accessed by the first core. The example of FIG. 13 shows a case where a misprediction is detected, which could be the scenario which an attacker may try to exploit.

At step 400 the first processor core makes a prediction (e.g. a branch prediction or a load address prediction) and based on the prediction at step 402 a speculative read operation is executed. This causes a ReadSpeculative transaction to be issued to the level one cache 32 at step 404, which specifies the target address #A to be read and an execution context ID, SXID1, associated with the execution context which executed the speculative read. This read speculative transaction causes an entry for address #A and SXID1 to be allocated into the SSB 70 associated with the level one cache 32 at step 406. Also the control circuitry 150 of the level one cache 32 at step 408 issues a further ReadSpeculative request specifying the target address and SXID1 to the level two cache 34 as its linefill request requesting data associated with address #A. At step 410 the ReadSpeculative request causes a further allocation of a speculative entry into the SSB 70 associated with the level two cache 34. In this example the level two cache 34 is the last level cache and so the level two cache issues a linefill request to main memory which eventually returns the data for address #A which can be written into the allocated SSB entry of the level two cache, and at step 412 this data is provided back to the level one cache and allocated into the SSB entry allocated at step 406. At step 414 the requested data for address #A is returned to the first processor core 100 where it can then be used by subsequent instructions.

At step 416 the first processor core 100 then resolves its speculation and finds that a misprediction was detected, and so the speculative read at step 402 was performed incorrectly. At some time after the misprediction is detected, at step 418 a SpeculativeInvalidate request is issued to the level one cache 32, specifying the target address #A of the incorrectly speculated read and the target SXID1, of the corresponding execution context. The exact timing of issuing the SpeculativeInvalidate request 418 may vary. In some cases resolution of speculation may be controlled for instructions at a block-based or epoch-based granularity, so that when a certain block or epoch of instructions is found to be incorrectly speculated, then SpeculativeInvalidate requests 418 are issued for the addresses accessed by any reads in that block.

In response to the SpeculativeInvalidate request, at step 420 the level one cache 32 invalidates any SSB entries in its SSB 70 associated with address #A and SXID1, and also the level one cache sends a further SpeculativeInvalidate request 422 for the same address and execution context identifier which at step 424 triggers a further invalidation of the SSB entry for the target address #A and SXID1 in the level two cache 34.

In this example, as no other actor tried to access the cache line allocated speculatively into the SSBs for address #A during the speculation window, then the speculative entries were still in the SSB when the SpeculativeInvalidate requests 418, 422 were received. Hence these can be invalidated and from the point of view of any actor other than the execution context identified by SXID1, this speculation never happened as far as the level one 32 and level two 34 are concerned. Hence, an attacker will not be able to derive any information about the outcome of the mis-speculated read based on analysing occupancy of the level one or level two caches 32, 34, mitigating against the type of attack discussed above.

Figure 14:
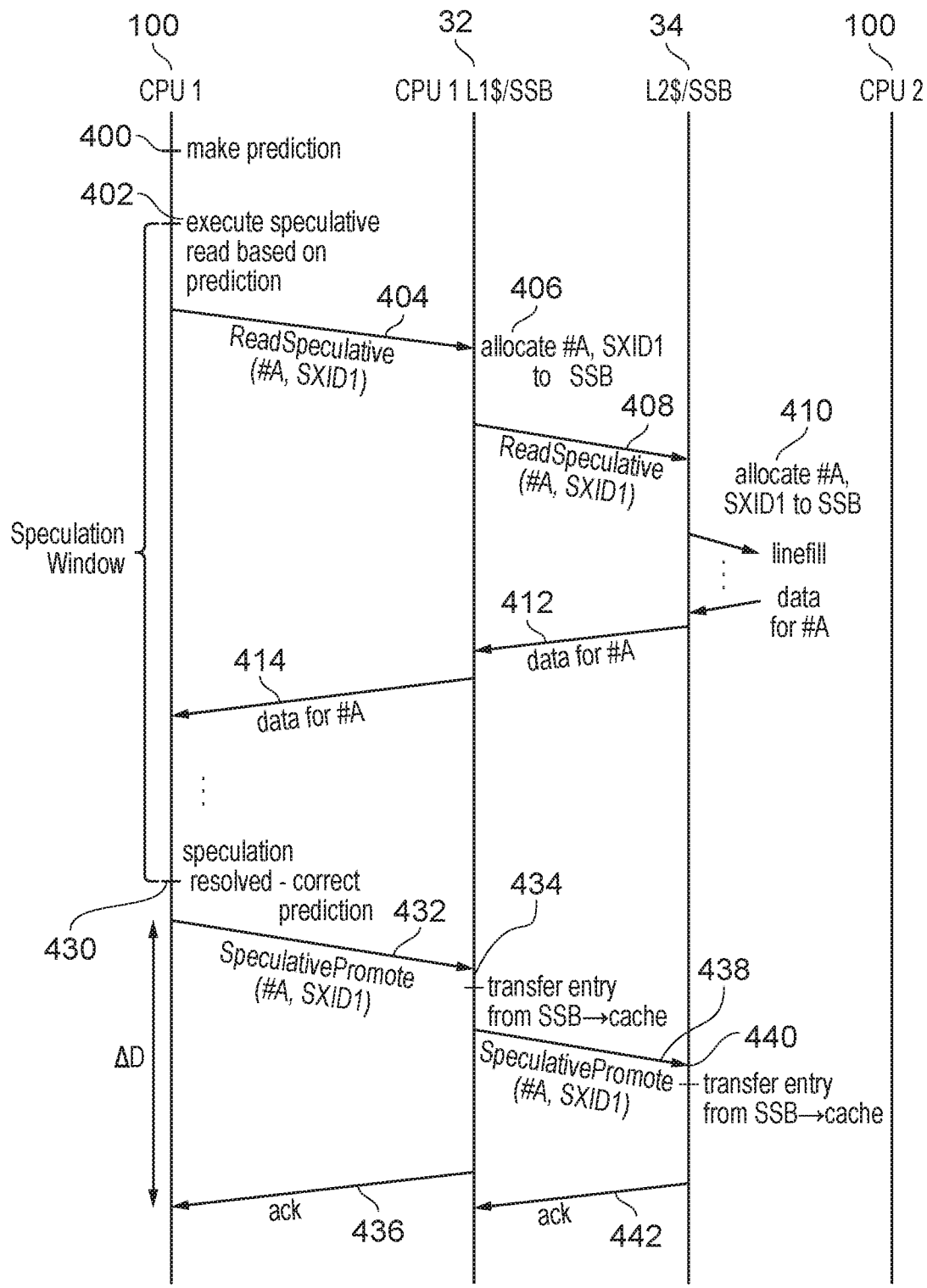
FIG. 14 shows an example where the prediction is determined to be correct following the speculative read operation.

FIG. 14 shows another execution example showing the case when the prediction was correct. Steps 400 to 414 of FIG. 14 are the same as in FIG. 13.

This time, at the end of the speculation window at step 430 the speculation is resolved as correct and so at step 432 a SpeculativePromote request (specifying the target address #A of the correctly speculated read and the target context identifier SXID1) is issued to the level one cache 32 associated with the first processor core 100. The exact timing of the SpeculativePromote request can vary. In some cases instructions may be committed and resolved as correct or incorrect individually, in which case the SpeculativePromote request can be issued directly in response to committing a given instruction. Alternatively, commitment may be controlled on a block by block basis and when a given block or epoch of instructions are all considered to be correctly speculated, then SpeculativePromote requests 432 can be issued for the block as a whole for each speculatively executed read that occurred within that block.

In response to the SpeculativePromote request at step 434 the level one cache 32 associated with core 1 transfers its speculative entry associated with address #A and context SXID1 from its SSB 70 to its main cache structure 72, 74. At step 436 the level one cache acknowledges the SpeculativePromote request 432 to confirm it has been completed. Also at step 438 the level one cache 32 sends a further SpeculativePromote request to the level two cache 34 which at step 440 also transfers the entry for address #A and target context SXID1 into its main cache structure and acknowledges the speculative promote request at step 442. It will be appreciated that the timing of the acknowledgement at steps 436 or 442 relative to the issuing of any further speculative promote request could vary.

Figure 15:
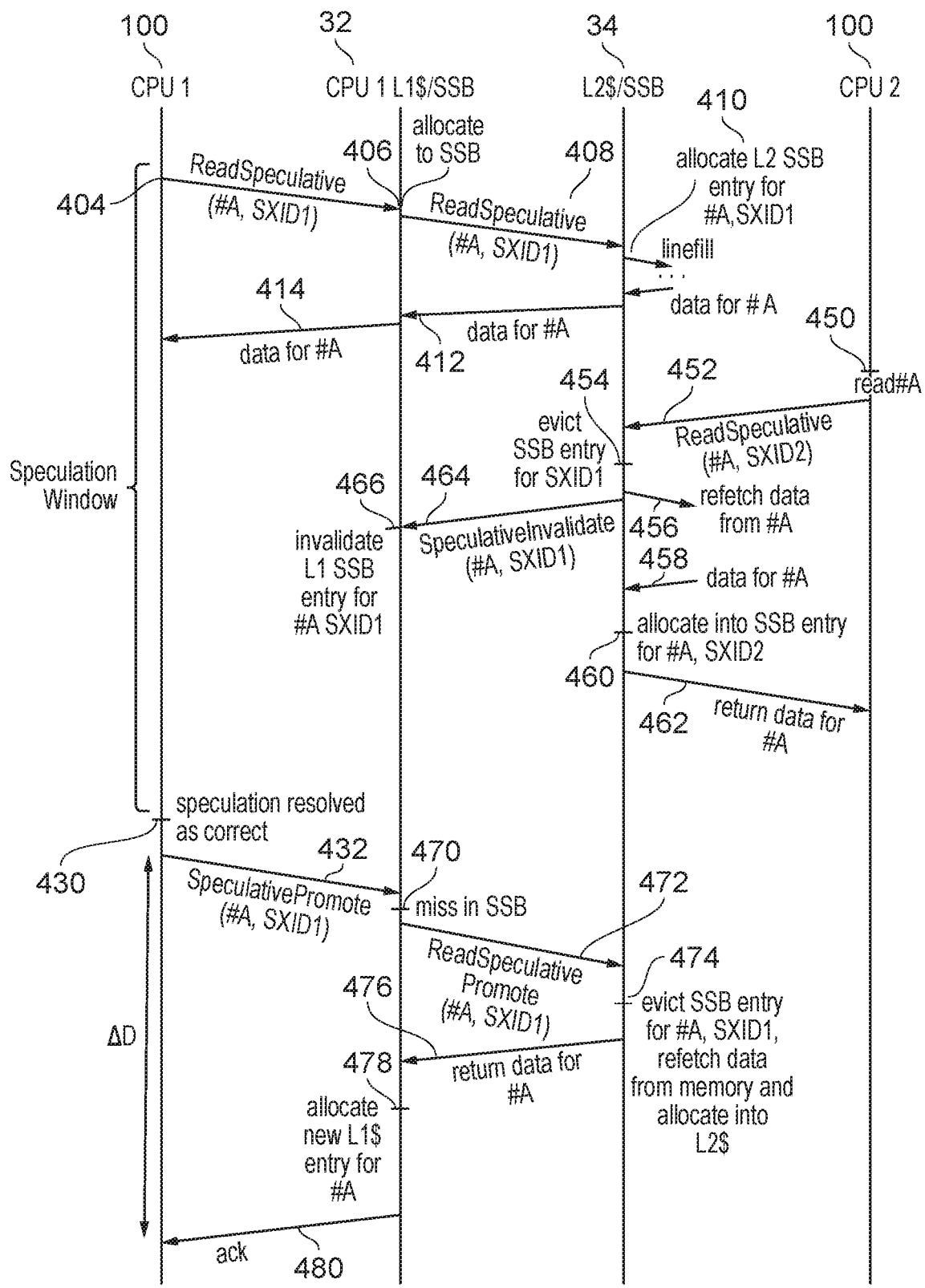
FIG. 15 shows an example in which the prediction is resolved as correct but during the speculation window another processor core accesses the same address as the address speculatively allocated to the speculative buffer during the speculation window.

FIG. 15 shows a more complex execution scenario where there is inter-core data sharing during the speculation window. Steps 400 to 414 are the same as in FIGS. 13 and 14. In FIG. 14, for conciseness steps 400 and 402 are not explicitly shown but would still have been performed.

In FIG. 15, at step 450, before the end of the speculation window on the first processor core CPU 1, a second processor core CPU 2 reads address #A either speculatively or non-speculatively. For sake of explanation, we shall assume that the read is a speculative read and so at step 452 a further ReadSpeculative request is sent to core 2's level one cache 32 and then subsequently onto the level two cache 34 which is shared with core 1. For conciseness, the intervening messaging via core 2's level one cache 32 is not shown in FIG. 15, but may operate in a similar way to the messaging involving core 1's level one cache at steps 406 to 414.

When the level two cache 34 shared between the two cores 100 receives the ReadSpeculative request 452 from the second core, it detects that this hits against an entry in the SSB 70 which has the same target address #A but specifies as its tagged SXID a different context identifier SXID1 compared to SXID2 specified as the target SXID in the ReadSpeculative request received at step 452. Therefore at step 454 this matching entry is evicted from the SSB associated with the level two cache 34, and at step 456 the level two cache refetches the data for address #A from main memory. As discussed above, an alternative to evicting and refetching the data could be simply to return the data to core 2 with a delay equivalent to the miss delay, but in this example we are showing the variant which evicts and refetches the data to simulate the miss. Hence, at step 458 the data for address #A is returned from main memory, and at step 460 this is allocated into a new SSB entry specifying as its target address #A and as its target context ID SXID2, and at step 462 the returned data is passed back to the second processor core via any level one cache.

Also, in response to detecting the mismatch between the SXID1 in the SSB entry and SXID2 in the read speculative request, at step 464 the level two cache also sends a SpeculativeInvalidate request to the level one cache 32 associated with processor core CPU 1 requesting that the SSB for CPU 1's level 1 cache also invalidates the corresponding SSB entry for #A and SXID1 at step 466.

At step 430 the first processor core resolves its speculation as correct and issues a SpeculativePromote request at step 432, the same as in FIG. 14. However this time at step 470 the control circuitry 150 associated with the level one cache 32 detects a miss in the SSB because the corresponding entry was previously invalidated at step 466, and so a ReadSpeculativePromote request is sent to the level two cache at step 472. At step 474 this causes the SSB entry for SXID2 and #A to be evicted, the data to be refetched from memory, and the corresponding data returned to the level one cache at step 476 which can then allocate it into its main cache structure at step 478. An acknowledgement is again returned at step 480.

To ensure that an attacker cannot gain information on whether CPU 2 accessed address #A or not, the acknowledgement sent at step 480 of FIG. 15 may be sent with the same delay since receiving the speculative promote request 432 as the acknowledgement sent at step 436 of FIG. 14. That is the delay ΔD in FIG. 14 between steps 432 and 436 may be the same as in the delay ΔD between steps 432 and 480 of FIG. 15.

In an alternative example to the scenario shown in FIG. 15, if after CPU 2 has accessed address #A and the SSB entry for #A, SXID1 in the SSB 70 associated with core 1's level cache had been invalidated as shown at step 466 of FIG. 15, core 1 had subsequently determined its speculation was incorrect (as in the example of FIG. 13), then a SpeculativeInvalidate request would be issued by core 1 (similar to step 418 of FIG. 13). The SpeculativeInvalidate request would miss in the level one SSB for core 1 because the level one SSB entry would already have been invalidated and so the SpeculativeInvalidate request would not require any further action to be carried out on the level one SSB. Also, if a SpeculativeInvalidate request (specifying #A, SXID1) is sent downstream from the level one SSB in response to the request sent by CPU 1 then this would not impact the state in the level two SSB, as the speculative line stored in the level two SSB would have a different SXID (SXID2 instead of SXID1). Alternatively, if the line was no longer speculative in the level two cache and is now in the main cache structure then the level two cache could also ignore the SpeculativeInvalidate request. Hence, even if there is intercore sharing of data and the speculation is resolved as mispredicted then this still does not expose any information.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
processing circuitry to execute instructions from one or more of a plurality of execution contexts each associated with a respective execution context identifier;
a cache;
a speculative buffer; and
control circuitry to control allocation of data to the cache and the speculative buffer; in which:
the control circuitry is configured to allocate a speculative entry, for which allocation is caused by a speculative memory access associated with a given execution context, to the speculative buffer instead of to the cache while the speculative memory access remains speculative, the speculative entry in the speculative buffer specifying, as a tagged execution context identifier, the execution context identifier associated with the given execution context; and
the control circuitry is configured to prevent presence of the speculative entry in the speculative buffer being observable to an execution context other than the given execution context identified by the tagged execution context identifier specified by the speculative entry; and
in response to a speculative memory access request received from a requester, the speculative memory access request specifying a target address and a target execution context identifier identifying an execution context associated with the speculative memory access request, the control circuitry is configured to perform a cache lookup in the cache based on the target address, and to perform a speculative buffer lookup in the speculative buffer based on the target address and the target execution context identifier; and
in response to both the cache lookup identifying a cache miss and the speculative buffer lookup identifying that the speculative buffer comprises an existing speculative entry corresponding to the target address for which there is a mismatch between the tagged execution context identifier and the target execution context identifier:
the control circuitry is configured to issue a request to trigger eviction, from another speculative buffer associated with at least one other cache, of a speculative entry corresponding to the target address and the tagged execution context identifier of the existing speculative entry.

2. The apparatus according to claim 1, in which the control circuitry is configured to exclusively allocate, to the cache, cache entries corresponding to non-speculative memory accesses or speculative memory accesses which have already been resolved as correct.

3. The apparatus according to claim 1, in which the control circuitry is configured to permit presence of a cache entry in the cache to be observable to an execution context other than the given execution context.

4. The apparatus according to claim 1, comprising at least two levels of cache, each of said at least two levels of cache associated with a corresponding speculative buffer to store a speculatively allocated entry for transferring to the corresponding level of cache after a speculative memory access which caused allocation of the speculatively allocated entry has been resolved as correct.

5. The apparatus according to claim 4, in which when issuing a further request to a downstream cache or memory as a response to a request received from the processing circuitry or an upstream cache specifying a given execution context identifier, the control circuitry is configured to issue the further request to the downstream cache or memory specifying the given execution context identifier.

6. The apparatus according to claim 1, in which the execution context identifier associated with the given execution context comprises a function of at least one of:
a processor core identifier identifying a processor core on which the given execution context is executed;
a hardware thread identifier identifying a hardware thread corresponding to the given execution context;
a virtual machine identifier identifying a virtual machine associated with the given execution context;
an address translation context identifier identifying an address translation context associated with the given execution context; and
a program instruction address of an instruction which started execution of a speculative block of instructions from the given execution context.

7. The apparatus according to claim 1, in which the cache is a shared cache shared between a plurality of processor cores, and the speculative buffer is accessible in response to requests issued by any of the plurality of processor cores.

8. The apparatus according to claim 1, in which the processing circuitry is configured to execute a plurality of hardware threads each associated with a respective hardware thread identifier, the execution context identifier associated with the given execution context is dependent on the hardware thread identifier of the hardware thread in which the given execution context is executed, and the speculative buffer is accessible to any of said hardware threads.

9. The apparatus according to claim 1, in which the speculative memory access associated with the given execution context is at least one of:
an instruction-triggered memory access issued in response to a speculatively executed memory access instruction of the given execution context; and
a prefetch-triggered memory access issued by a prefetcher.

10. The apparatus according to claim 1, in which the control circuitry is configured to allocate the speculative entry to the speculative buffer in response to a speculative read request to request reading of data associated with a target address.

11. The apparatus according to claim 1, in which when the cache lookup identifies a cache miss, and the speculative buffer lookup identifies that the speculative buffer comprises an existing speculative entry corresponding to the target address for which the tagged execution context identifier matches the target execution context identifier, the control circuitry is configured to service the speculative memory access request using data stored in the speculative buffer in the existing speculative entry corresponding to the target address for which the tagged execution context identifier matches the target execution context identifier.

12. The apparatus according to claim 1, in which when the cache lookup identifies a cache miss, and the speculative buffer lookup identifies that the speculative buffer comprises the existing speculative entry corresponding to the target address for which there is a mismatch between the tagged execution context identifier and the target execution context identifier, the control circuitry is configured to service the speculative memory access request with a delay corresponding to a miss delay incurred when the speculative memory access request misses in both the cache and the speculative buffer.

13. The apparatus according to claim 12, in which the control circuitry is configured to service the speculative memory access request with the delay corresponding to the miss delay by one of:
    returning a response to the requester based on the existing speculative entry after a simulated delay simulating the miss delay, while the existing speculative entry remains valid in the speculative buffer; and
    triggering eviction of the existing speculative entry, and issuing a linefill request to a downstream cache or memory to request re-fetching of data associated with the existing speculative entry.

14. The apparatus according to claim 1, in which in response to a speculative-promote request specifying a target address, when the speculative buffer comprises a given speculative entry corresponding to the target address specified by the speculative-promote request, the control circuitry is configured to transfer the given speculative entry to the cache.

15. The apparatus according to claim 14, in which in response to the speculative-promote request, when there are no speculative entries in the speculative buffer that correspond to the target address specified by the speculative-promote request, the control circuitry is configured to issue a request to a downstream cache or memory to request fetching of data associated with the target address specified by the speculative-promote request into the cache.

16. The apparatus according to claim 14, in which the processing circuitry is configured to trigger issuing of the speculative-promote request specifying a given target address after resolving that speculation was correct for a speculative memory access specifying the given target address.

17. The apparatus according to claim 14, in which when the speculative-promote request is a read-speculative-promote request, when the speculative buffer comprises the given speculative entry, the control circuitry is also configured to control data associated with the given speculative entry to be returned to the requester in response to the read-speculative-promote request.

18. The apparatus according to claim 1, in which in response to a speculative-invalidate request specifying a target address and a target execution context identifier, the control circuitry is configured to trigger invalidation of any existing speculative entry corresponding to the target address specified by the speculative-invalidate request and the target execution context identifier specified by the speculative-invalidate request from the speculative buffer or from another speculative buffer associated with another cache.

19. A method comprising:
    executing instructions from one or more of a plurality of execution contexts each associated with a respective execution context identifier;
    in response to a speculative memory access associated with a given execution context, allocating a speculative entry to a speculative buffer instead of to a cache while the speculative memory access remains speculative, the speculative entry in the speculative buffer specifying, as a tagged execution context identifier, the execution context identifier associated with the given execution context; and
    preventing the presence of the speculative entry in the speculative buffer being observable to execution contexts other than the given execution context identified by the tagged execution context identifier specified by the speculative entry; and
    in response to a speculative memory access request received from a requester, the speculative memory access request specifying a target address and a target execution context identifier identifying an execution context associated with the speculative memory access request, performing a cache lookup in the cache based on the target address, and performing a speculative buffer lookup in the speculative buffer based on the target address and the target execution context identifier; and
    in response to both the cache lookup identifying a cache miss and the speculative buffer lookup identifying that the speculative buffer comprises an existing speculative entry corresponding to the target address for which there is a mismatch between the tagged execution context identifier and the target execution context identifier:
    issuing a request to trigger eviction, from another speculative buffer associated with at least one other cache, of a speculative entry corresponding to the target address and the tagged execution context identifier of the existing speculative entry.

* * * * *